United States Patent
Ichino et al.

(10) Patent No.: US 9,481,789 B2
(45) Date of Patent: Nov. 1, 2016

(54) MATRIX RESIN COMPOSITION, PREPREG AND METHOD FOR PRODUCING THE SAME, AND FIBER-REINFORCED COMPOSITE MATERIAL

(75) Inventors: Masahiro Ichino, Aichi (JP); Manabu Kaneko, Aichi (JP); Kazuki Koga, Aichi (JP); Teppei Miura, Aichi (JP); Takuya Teranishi, Aichi (JP); Kiharu Numata, Aichi (JP); Kazutami Mitani, Tokyo (JP); Tadao Samejima, Aichi (JP)

(73) Assignee: Mitsubishi Rayon Co., Ltd., Tokyo (*) Notice: Subject to any disclaimer, the term of this patent is extended or adjusted under 35 U.S.C. 154(b) by 103 days.

(21) Appl. No.: 14/001,391

(22) PCT Filed: Mar. 2, 2012

(86) PCT No.: PCT/JP2012/055473
§ 371 (c)(1),
(2), (4) Date: Aug. 23, 2013

(87) PCT Pub. No.: WO2012/118208
PCT Pub. Date: Sep. 7, 2012

(65) Prior Publication Data
US 2013/0327479 A1 Dec. 12, 2013

(30) Foreign Application Priority Data

Mar. 3, 2011 (JP) .................................. 2011-046576
Jan. 20, 2012 (JP) .................................. 2012-010429

(51) Int. Cl.
C08J 5/24 (2006.01)
C08L 63/10 (2006.01)
(Continued)

(52) U.S. Cl.
CPC ........... C08L 63/10 (2013.01); C08G 59/1466 (2013.01); C08G 59/4021 (2013.01);
(Continued)

(58) Field of Classification Search
CPC combination set(s) only.
See application file for complete search history.

(56) References Cited

U.S. PATENT DOCUMENTS 2,596,162 A * 5/1952 Muskat .......................... 442/286
4,372,800 A * 2/1983 Oizumi .................. B29C 70/50
156/247

(Continued)

FOREIGN PATENT DOCUMENTS

EP 2682429 A1 1/2014
GB 1 570 991 7/1980

(Continued)

OTHER PUBLICATIONS

Machine Translation of JP 2003-105109 A to Takiyama et al. Date unknown.*

(Continued)

*Primary Examiner* — Michael Tolin
(74) *Attorney, Agent, or Firm* — Morgan, Lewis & Bockius LLP

(57) ABSTRACT

The present invention relates to a method for producing a prepreg which contains reinforcing fibers and a matrix resin composition with the weight per square meter of the reinforcing fibers being 250-2,000 g/m². The production method comprises the following steps (1)-(3): (1) a matrix resin composition blending step for obtaining a matrix resin composition by mixing an epoxy resin, a radically polymerizable unsaturated compound, an epoxy resin curing agent and a polymerization initiator that generates radicals, in said step the content of the radically polymerizable unsaturated compound relative to 100% by mass of the total of the epoxy resin and the radically polymerizable unsaturated compound being 10-25% by mass; (2) a matrix resin composition impregnating step; and (3) a surface viscosity increasing step.

14 Claims, 2 Drawing Sheets

(51) Int. Cl.
*C08G 59/17* (2006.01)
*C08G 59/40* (2006.01)
*C08K 5/00* (2006.01)

(52) U.S. Cl.
CPC .......... *C08J 5/24* (2013.01); *B32B 2305/076* (2013.01); *C08J 2363/00* (2013.01); *C08J 2363/10* (2013.01); *C08K 5/0025* (2013.01); *Y10T 428/27* (2015.01)

(56) References Cited

U.S. PATENT DOCUMENTS

| | | | |
|---|---|---|---|
| 5,104,718 A | | 4/1992 | Asada et al. |
| 5,387,301 A | * | 2/1995 | Miyao et al. ............... 156/179 |
| 5,396,932 A | * | 3/1995 | Homma ............... D03D 15/00 139/420 A |
| 2009/0246468 A1 | | 10/2009 | Schubiger |

FOREIGN PATENT DOCUMENTS

| | | |
|---|---|---|
| JP | 52-100574 | 8/1977 |
| JP | 58-008732 A | 1/1983 |
| JP | 58-019332 A | 2/1983 |
| JP | 64-56741 A | 3/1989 |
| JP | 02-227212 A | 9/1990 |
| JP | 4-244834 | 9/1992 |
| JP | 07-068542 A | 3/1995 |
| JP | 07-227840 A | 8/1995 |
| JP | 07-324119 A | 12/1995 |
| JP | 08-267664 A | 10/1996 |
| JP | 09-003158 A | 1/1997 |
| JP | 09-100360 A | 4/1997 |
| JP | 09-208838 A | 8/1997 |
| JP | 11-043547 A | 2/1999 |
| JP | 11-171974 A | 6/1999 |
| JP | 2002/105223 A | 4/2002 |
| JP | 2002-327076 A | 11/2002 |
| JP | 2003-105109 A | 4/2003 |
| JP | 2009-108217 A | 5/2009 |
| JP | 2010-156081 A | 7/2010 |
| JP | 2010-215800 | 9/2010 |
| JP | 2011-515531 A | 5/2011 |
| TW | 332235 | 5/1998 |
| WO | 02/06027 A1 | 1/2002 |
| WO | 2007/038673 A1 | 4/2007 |
| WO | WO 2008/059603 A1 * | 5/2008 |
| WO | 2009/115832 A1 | 9/2009 |
| WO | 2011/117643 A1 | 9/2011 |
| WO | 2012/010293 A1 | 1/2012 |
| WO | 2012/118208 | 9/2012 |

OTHER PUBLICATIONS

Dow Liquid Epoxy Resins. http://msdssearch.dow.com/PublishedLiteratureDOWCOM/dh_0030/0901b8038003041c.pdf?filepath=/296-00224.pdf&fromPage=GetDoc. Published Jan. 1999.*

Machine Translation of JP 2010-156081 A. Date Unknown.*

Thorfinsson et al., Production of void free composite parts without debulking, 31st International SAMPE Symposium, Apr. 7-10, 1986, pp. 480-490.

Thorfinnson et al., Degree of impregnation of prepregs—effects on porosity, 32nd International SAMPE Symposium, Apr. 6-9, 1987, pp. 1500-1509.

Office Action issued in related Taiwanese Patent Application No. 101107026 dated Mar. 10, 2014 (see partial English translation).

International Search Report dated May 22, 2012 for International Application No. PCT/JP2012/055473.

International Search report for PCT/JP2013/073964 dated Dec. 3, 2013.

Extended European Search Report for European Patent Application No. 13835598.7 dated Feb. 15, 2016.

* cited by examiner

US 9,481,789 B2

MATRIX RESIN COMPOSITION, PREPREG AND METHOD FOR PRODUCING THE SAME, AND FIBER-REINFORCED COMPOSITE MATERIAL

TECHNICAL FIELD

The present invention relates to a matrix resin composition suitable for a fiber-reinforced composite material and a prepreg using the same, as well as a fiber-reinforced composite material.

This application is based on and claims the benefit of priority from Japanese Patent Application No. 2011-046576 filed on Mar. 3, 2011 and Japanese Patent Application No. 2012-010429 filed on Jan. 20, 2012, the content of which is incorporated herein by reference.

BACKGROUND ART

The fiber-reinforce composite material composed of a reinforcing fiber and a matrix resin is lightweight and has superior mechanical characteristics. For such a reason, the fiber-reinforced composite material is widely used as a structural material for aircrafts, automobiles, ships, construction and the like, as well as for sporting equipment such as golf shafts, fishing rods, tennis rackets and the like.

Various methods are used for producing the fiber-reinforced composite material. Among these, a method of impregnating a reinforcing fiber assembly with a matrix resin to thereby obtain a sheet like, a tape like, or a string like prepreg which is used as an intermediate base material is widely practiced. A thermally curable resin and a thermoplastic resin can be used as the matrix resin used for the prepreg, and the thermally curable resin is used more often.

A molded product (fiber-reinforced composite material) is obtained by laminating the prepreg in multiple layers, placing on a mold material, and then heating. Here, appropriate stickiness (tack property) of a surface of the prepreg can facilitate placing thereof onto the mold material and joining of the prepregs. In addition, if the position of the prepreg placed on the mold material is improper, correction of position is necessary. Therefore, excessive tack property is undesired on the surface of the prepreg.

If a molded product to be obtained has a curved shape, a curved mold material is used. Here, a rigid prepreg does not follow the shape of the mold material onto which the prepreg is placed. Therefore, appropriate flexibility is required for a prepreg.

For molding of a fiber-reinforced composite material using a prepreg, generally a plurality of prepregs of a given thickness is laminated to obtain the fiber-reinforced composite material of a desired thickness. Here, in a case of using the material as a structural material for vehicles such as ships, railway vehicles, and automobiles, as well as for windmills and the like, components are large in size and high in thickness. Given this, for such purposes, it is advantageous to use a prepreg high in thickness. A thick prepreg can be obtained by increasing the thickness of the reinforcing fiber assembly.

In production of the fiber-reinforced composite material, it is important to reduce voids generated due to portions, which are not impregnated with a matrix resin, inside of the material. If the prepreg has voids, the voids persist in the fiber-reinforced composite material, which is a molded product, and causes failure leading to reduced strength of the fiber-reinforced composite material. Therefore, it is necessary that the prepreg does not have voids.

Upon impregnation of the reinforcing fiber assembly with the matrix resin, exceedingly high viscosity of the matrix resin makes it difficult to impregnate the reinforcing fiber assembly with the matrix resin down to the inside thereof. In order to solve this problem, a so-called lacquer method and a varnish method have been proposed. In these methods, a thermally curable resin and a solvent are blended, the reinforcing fiber assembly is impregnated with the mixture, and then the solvent is removed by drying, thereby obtaining a prepreg.

However, in these methods, if the temperature of drying for removing the solvent is too high, the thermally curable resin cures at a stage of prepreg. In addition, this may dissolve or modify the curing agent in the thermally curable resin and a problem of shorter working life of the prepreg is likely. This problem is noticeable particularly in a case of using a thermally curable resin with a low curing temperature. In other words, in these methods, it is difficult to fully remove the solvent in the prepreg. If the solvent remains, the solvent is gasified during molding and causes voids in the fiber-reinforced composite material.

In order to solve this problem, a so-called hot melt film method has been proposed. In this method, a film of a thermally curable resin (resin film) is formed without using a solvent, the resin film is attached to a surface of, for example, a sheet-like reinforcing fiber assembly in which reinforcing fiber bundles are aligned, the sheet is heated to reduce viscosity and then pressurized to impregnate the reinforcing fiber assembly with the thermally curable resin, to thereby obtain a prepreg. However, in the hot melt film method, a thick reinforcing fiber assembly, more specifically a reinforcing fiber assembly having a weight of 300 g/m$^2$ or greater, cannot be fully impregnated with the thermally curable resin from the surface to the inside.

In addition, high viscosity of the matrix resin may inhibit movement of the reinforcing fiber assembly during impregnation with the resin. Therefore, in the sheet-like reinforcing fiber assembly in which fiber bundles are aligned, if the reinforcing fiber bundles are not distributed evenly, surface smoothness of the prepreg after impregnation with the matrix resin is likely to be insufficient and colored patches are likely to be present in appearance. In order to avoid these problems, the impregnation must be performed under high pressure.

However, in a case of making the matrix resin enter into between monofilaments of the reinforcing fiber assembly under high pressure, so-called springback is likely to occur. The springback is a phenomenon in which the reinforcing fiber bundles, which have been compressed, gradually return to an original shape after the pressure upon producing the prepreg is removed, as if the fiber bundles remember the shape before the impregnation. Therefore, the hot melt film method is not appropriate for producing the thick prepreg.

Low viscosity of the matrix resin facilitates the impregnation of the reinforcing fiber assembly therewith. Given this, high temperature is not required during impregnation. In addition, since the reinforcing fiber bundles easily spread upon impregnation, high external pressure is not required. This can prevent the springback. In addition, since the impregnation with the resin can be preferably performed, the speed of a production line can be increased and productivity can be improved. Furthermore, the reinforcing fiber bundles with a high number of monofilaments can be used. In general, the reinforcing fiber bundles with a higher number of monofilaments are less expensive and advantageous in terms of cost. This also can reduce the number of reinforcing fiber bundles required, thereby improving productivity of the prepreg.

In a case in which the viscosity of the matrix resin is sufficiently low, methods other than the hot melt film method, for example, a method of impregnating the reinforcing fiber assembly with the matrix resin by a touch roller method, a dipping method, a dyeing method, a dispenser method and the like can be used. In these methods, it is not required to prepare a thermally curable resin film by a separate step. In addition, mold release paper, which is required in a case in which the viscosity of the matrix resin is high, is not necessarily required. These methods are cost effective since there is no need for: processing cost for an additional step; the mold release paper for supporting the thermally curable resin film; a protection film for protecting the thermally curable resin film; and the like. Furthermore, in these methods, an extremely thick prepreg, which is difficult to produce by a method using the mold release paper, can easily be produced.

However, in a case of using the matrix resin of low viscosity, the viscosity of the matrix resin in the prepreg to be obtained is also low, which has caused the following problems.

The tack property of the surface of the prepreg is too high and handling of the prepreg is difficult. In addition, the matrix resin may easily adhere to an operator and to a work area. Furthermore, the prepreg using the reinforcing fiber bundles aligned in one direction is low in proof strength against a force applied in a direction intersecting the direction of alignment of the reinforcing fiber bundles. This causes meandering of the reinforcing fiber bundles and breakage of the prepreg. In addition, it is difficult to correct an inappropriate position of the laminated prepregs.

In other words, there is a trade-off relationship between the viscosity of the matrix resin and the handling property of the prepreg.

As a resin composition that can solve the problem of trade-off, for example, Patent Document 1 discloses a resin composition comprising a thermally curable resin such as epoxy resin, radically polymerizable unsaturated compound, and a polymerization initiator that generates radicals in response to heating. In Patent Document 1, after impregnating the reinforcing fiber with the resin composition, the polymerization initiator is reacted therewith to generate radicals. Here, the resin composition with which the reinforcing fiber is impregnated is heat processed at a temperature lower than the temperature for curing the thermally curable resin, in order to increase viscosity of the resin composition in the prepreg.

However, in the method disclosed in Patent Document 1, a curing reaction of the thermally curable resin progresses in a part being heated. Therefore, the viscosity is increased not only at the surface but also in a central part of the prepreg. As a result, especially in a heavy weight prepreg, rigidity is remarkably increased due to increased viscosity of the matrix resin, leading to reduction in flexibility of the prepreg.

Reactivity of the polymerization initiator to heat processing after impregnation can be controlled by adding a polymerization inhibitor or a polymerization accelerator to the resin composition. However, the polymerization inhibitor or the polymerization accelerator makes the reaction complex. In addition, adding the polymerization accelerator may initiate a curing reaction of the thermally curable resin and may shorten a working life of the prepreg.

PRIOR ART REFERENCE

Patent Document 1: Japanese Unexamined Patent Application, Publication No. H9-208838

DISCLOSURE OF THE INVENTION

Problems to be Solved by the Invention

The present invention has been made in view of the abovementioned situation. A first objective of the present invention is to provide a method for producing a prepreg which contains reinforcing fibers and a matrix resin composition with the weight per square meter of the reinforcing fibers being 250-2,000 $g/m^2$, in which the reinforcing fiber assembly can be impregnated with the matrix resin without generating voids, and a prepreg having a superior flexibility and a tack property can be obtained.

A second objective of the present invention is to provide a prepreg which contains reinforcing fibers and a matrix resin composition with the weight per square meter of the reinforcing fibers being 250-2,000 $g/m^2$, prepreg having a superior flexibility and a tack property.

A third objective of the present invention is to provide a matrix resin composition that can be preferably used in production of a prepreg with the weight per square meter of the reinforcing fibers being 250-2,000 $g/m^2$.

A fourth objective of the present invention is to provide a fiber-reinforced composite material obtained by curing the above described prepreg.

Means for Solving the Problems

A first aspect of the present invention has the following modes.

[1] A method for producing a prepreg which contains reinforcing fibers and a matrix resin composition with the weight per square meter of the reinforcing fibers being 250-2,000 $g/m^2$, the production method comprising the following steps (1)-(3):

(1) a matrix resin composition blending step for obtaining a matrix resin composition by mixing an epoxy resin, a radically polymerizable unsaturated compound, an epoxy resin curing agent and a polymerization initiator that generates radicals, in said step the content of the radically polymerizable unsaturated compound relative to 100% by mass of the total of the epoxy resin and the radically polymerizable unsaturated compound being 10-25% by mass;

(2) a matrix resin composition impregnating step for obtaining a prepreg precursor by impregnating a reinforcing fiber assembly being 250-2,000 $g/m^2$ in weight with the matrix resin composition; and (3) a surface viscosity increasing step of obtaining a prepreg in which viscosity of the matrix resin composition is increased more in a superficial part than in a central part, by stimulating the prepreg precursor to let the polymerization initiator present in the superficial part of the prepreg precursor generate a radical, while not letting the polymerization initiator present in the central part generate a radical.

[2] The method for producing a prepreg as described in [1], wherein the matrix resin composition used for impregnation in the step (2) has a viscosity of 12 Pa·s to 40,000 Pa·s at 30° C.

[3] The method for producing a prepreg as described in [1] or [2], wherein a means for letting the polymerization initiator generate a radical in the above described step (3) is the following method (3-i):
(3-i) a method of irradiating the prepreg precursor with an energy wave selected from a group consisting of: ultraviolet; infrared; visible light; and electron beam, with an incident intensity no greater than such an incident intensity that transmittance becomes 0% at a depth of 40% from a surface of the prepreg precursor with respect to a thickness of the prepreg precursor being 100%.

[4] The method for producing a prepreg as described in [3], wherein the polymerization initiator is α-aminoalkyl phenone or α-hydroxyalkyl phenone.

[5] The method for producing a prepreg as described in [1] or [2], wherein a means for letting the polymerization initiator generate a radical in the above described step (3) is the following method (3-ii):
(3-ii) a method of heating the prepreg precursor from the outside in a non-contact state, for such a time period that a rate of temperature change becomes 0% at a depth of 40% from a surface of the prepreg precursor with respect to a thickness of the prepreg precursor being 100%.

[6] The method for producing a prepreg as described in [5], wherein the method (3-ii) is realized by high frequency heating.

[7] The method for producing a prepreg as described in [1] or [2], wherein the step (2) includes the following steps (2-i) to (2-iii):
(2-i) a matrix resin composition applying step of applying the matrix resin composition to a first face of a first reinforcing fiber sheet A1 composed of consecutive reinforcing fiber bundle;
(2-ii) a reinforcing fiber matrix laminating step of laminating a second reinforcing fiber sheet A2 composed of consecutive reinforcing fiber bundles onto the face of the A1 to which the matrix resin composition has been applied; and
(2-iii) a pressurizing step of obtaining the prepreg precursor by impregnating the A1 and the A2 with the matrix resin composition by pressurizing the A1 and A2.

[8] The method for producing a prepreg according to [1] or [2], wherein the step (2) includes the following steps (2-iv) to (2-vi):
(2-iv) a matrix resin composition applying step of applying the matrix resin composition to a first reinforcing fiber sheet A1 composed of consecutive reinforcing fiber bundle;
(2-v) a reinforcing fiber matrix laminating step of laminating a second reinforcing fiber sheet A2 and a third reinforcing fiber sheet A3 composed of consecutive reinforcing fiber bundles, onto a first face of the A1 and a second face of the A1 respectively; and
(2-vi) a pressurizing step of obtaining the prepreg precursor by impregnating the A1, the A2, and the A3 with the matrix resin composition by pressurizing the A1, the A2, and the A3.

A second aspect of the present invention has the following mode.

[9] A prepreg comprising a reinforcing fiber and a matrix resin composition with the weight per square meter of the reinforcing fibers being 250-2,000 g/m$^2$, wherein the prepreg is flexible to such a degree that the prepreg can follow a curve when being placed on a mold material which is curved, and has a tack property of such a degree that the prepreg can be rearranged after laminating the prepregs.

A third aspect of the present invention has the following mode.

[10] A fiber-reinforced composite material, wherein the fiber-reinforce composite material is obtained by curing the prepreg as described in [9].

A fourth aspect of the present invention has the following mode.

[11] A matrix resin composition for a fiber-reinforced composite material, comprising: an epoxy resin; a radically polymerizable unsaturated compound; an epoxy resin curing agent; and a polymerization initiator that generates radicals, wherein
the epoxy resin contains at least an epoxy resin having an oxazolidone ring in the molecule, and the content of the radically polymerizable unsaturated compound relative to 100% by mass of the total of the epoxy resin and the radically polymerizable unsaturated compound is 10 to 25% by mass.

Effects of the Invention

According to the method for producing a prepreg of the present invention, even in the prepreg with the weight per square meter of the reinforcing fibers being 250-2,000 g/m$^2$, the reinforcing fiber assembly can be impregnated with the matrix resin composition without generating voids, and a prepreg having a superior flexibility and a tack property can be obtained. In addition, the prepreg obtained by the method for producing a prepreg of the present invention is free from springback.

According to the prepreg of the present invention, even a prepreg with the weight per square meter of the reinforcing fibers being 250-2,000 g/m$^2$ has a superior flexibility and a tack property. The prepreg is suitable for production of large sized structural materials for vehicles, windmills and the like.

According to the matrix resin composition of the present invention, in production of a prepreg with the weight per square meter of the reinforcing fibers being 250-2,000 g/m$^2$, a superior flexibility and a tack property can be obtained; and, in use as the fiber-reinforced composite material after curing, superior physical properties can be obtained.

According to the fiber-reinforced composite material of the present invention, even in a fiber-reinforced composite material with the weight per square meter of the reinforcing fibers being 250-2,000 g/m$^2$, a gap formed between a mold and a prepreg in production of a large sized molded product having a non-linear shape can be suppressed by superior followability to a mold due to superior flexibility and tack property; and generation of voids can be prevented by the appropriate tack property eliminating air pockets between the mold and the prepreg.

EXPLANATION OF REFERENCE NUMERALS

Figure 1:
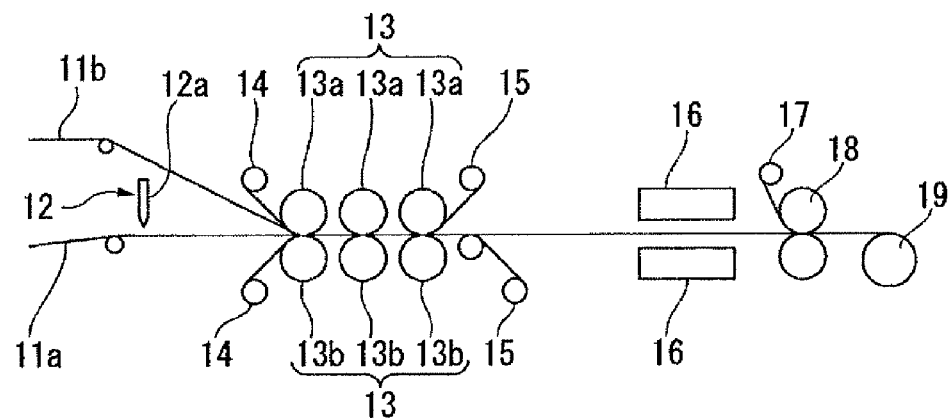
FIG. 1 is a schematic view illustrating an example of the method for producing a prepreg of the present invention.

11*a* Reinforcing fiber sheet A1
11*b* Reinforcing fiber sheet A2

11c Reinforcing fiber sheet A3
12 Application unit
12a Die
12b Resin bath
12c Touch roller
13 Pressurization unit
13a, b Pressurization rollers
14 Protection sheet supply roller
14a, b Protection sheet
15 Protection sheet winding roller
16 Surface viscosity increasing step
17 Protection film
18 Driving roller
19 Winding means
20 Prepreg

PREFERRED MODE FOR CARRYING OUT THE INVENTION

The present invention is described in detail hereinafter. The present invention relates to a prepreg with the weight per square meter of the reinforcing fibers being 250-2,000 g/m$^2$ and a method for producing the same, a matrix resin composition, and a fiber-reinforced composite material. The present invention is more preferably used for a prepreg with the weight per square meter of the reinforcing fibers being at least 400 g/m$^2$. The present invention is even more preferably used for a prepreg with the weight per square meter of the reinforcing fibers being at least 500 g/m$^2$. The present invention is particularly preferably used for a prepreg with the weight per square meter of the reinforcing fibers being at least 600 g/m$^2$.

(Matrix Resin Composition)

The matrix resin composition of the present invention is for a fiber-reinforced composite material and comprises: an epoxy resin; a radically polymerizable unsaturated compound; an epoxy resin curing agent; and a polymerization initiator that generates radicals.

[Epoxy Resin]

As the epoxy resin used for a prepreg and a method for producing the prepreg according to the present invention, for example, a glycidyl ether type epoxy resin, glycidyl amine type epoxy resin, glycidyl ester type epoxy resin, and alicyclic epoxy resin, as well as an epoxy resin with radicals of at least two types selected from the abovementioned resins being present in a molecule, can be exemplified.

Specific examples of the glycidyl ether-type epoxy resin include bisphenol A-type epoxy resins, bisphenol F-type epoxy resins, resorcinol-type epoxy resins, phenol novolac-type epoxy resins, polyethylene glycol-type epoxy resins, polypropylene glycol-type epoxy resins, naphthalene-type epoxy resins, dicyclopentadiene-type epoxy resins, and regioisomers thereof and those obtained by substituting them with an alkyl group or halogen.

Specific examples of the glycidyl amine-type epoxy resin include tetraglycidyl diaminodiphenyl methanes, glycidyl compounds of aminophenol and aminocresol, glycidyl anilines, and glycidyl compounds of xylene diamine, and the like.

Specific examples of the glycidyl ester-type epoxy resins include phthalic diglycidyl ester, hexahydrophthalic diglycidyl ester, isophthalic diglycidyl ester, dimer acid diglycidyl ester, and various isomers thereof.

The epoxy resins may be used singly or in combination of two or more. Among these epoxy resins, it is preferable to include a bisphenol A-type epoxy resin, from the viewpoint of heat resistant property and toughness.

By including an epoxy resin having an oxazolidone ring in the molecule as the epoxy resin, high Tg is obtained and toughness is increased. Such an epoxy resin can provide superior physical properties when used in a fiber-reinforced composite material, and is therefore more preferable. More specifically, a 0° compression strength, a 0° bending strength, a 90° bending strength, an interlayer shearing strength, and Tg are improved. Especially the 90° bending strength and Tg are remarkably improved. This may be because the oxazolidone ring has a rigid skeleton which gives high Tg even in a low crosslink density and can provide high toughness and high Tg simultaneously, and because a large number of oxygen atoms composing the oxazolidone ring have polarities thereby realizing superior adherence between the epoxy resin having the oxazolidone ring in the molecule and a surface of carbon fiber.

The content of the epoxy resin having an oxazolidone ring in the molecule is preferably 2 to 95% by mass and more preferably 5 to 60% by mass with respect to the entire epoxy resin being 100% by mass. The above specified content can realize simultaneously a heat resistant property and high toughness of the cured resin.

An upper limit of the content of the epoxy resin having an oxazolidone ring in the molecule is more preferably 80% by mass, and yet more preferably 40% by mass, with respect to the entire epoxy resin being 100% by mass.

A lower limit of the content of the epoxy resin having an oxazolidone ring in the molecule is more preferably 4% by mass, and yet more preferably 10% by mass, with respect to the entire epoxy resin being 100% by mass.

A preferred example of the epoxy resin having an oxazolidone ring in the molecule is AER4152. An oxazolidone ring structure is represented by the following formula (1). The oxazolidone ring structure can be obtained, for example, by a reaction between an epoxy ring and isocyanate.

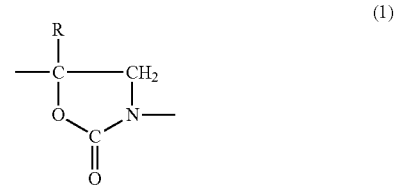

(1)

Here, R represents a hydrogen atom, a halogen atom or an alkyl group.

As the halogen atom, a fluorine atom, a chlorine atom, a bromine atom, and an iodine atom can be exemplified.

As the alkyl group, a straight or branched alkyl group having a carbon number of 1 to 10 can be exemplified. More specifically, methyl, ethyl, propyl, isopropyl, butyl, isobutyl, sec-butyl, tert-butyl, pentyl, isopentyl, neopentyl, hexyl, heptyl, octyl, nonyl, decyl and the like can be exemplified.

As the epoxy resin having an oxazolidone ring in the molecule, an isocyanate modified epoxy resin can be exemplified. As a commercially available epoxy resin having an oxazolidone ring in the molecule, AER4152, XAC4151, LSA4311, LSA4311, LSA7001 (manufactured by ASAHI KASEI E-MATERIALS) can be exemplified.

[Radically Polymerizable Unsaturated Compound]

The radically polymerizable unsaturated compound used in the prepreg and the method for producing the prepreg of the present invention is a compound including a radically polymerizable unsaturated bond, in other words a double bond or a triple bond, in the molecule. The radically polymerizable unsaturated compound used in the present invention can be used singly or in combination of two or more being blended. As the radically polymerizable unsaturated compound, a low molecular compound having at least one, for example 1 to 6, radically polymerizable unsaturated bond(s) in a molecule can be exemplified. Examples of such a low molecular compound include a (meth)acrylate compound, a (meth)acrylic acid adduct, an allyl phthalate compound, an allyl isophthalate compound, an allyl terephtalate compound, an allyl cyanurate compound and the like. An acrylate compound and a methacrylate compound are preferable.

As the radically polymerizable unsaturated compound, a high molecular compound or an oligomer having a radically polymerizable unsaturated bond can be exemplified. As such a compound, a compound having a radically polymerizable unsaturated bond in a terminal, a side chain, and a main chain can be used. For example, a compound in which a terminal hydroxyl group of polyethylene glycol or polypropylene glycol is esterified with acrylic acid or methacrylic acid; polyester including maleic acid or the fumaric acid as an acid component; polyimide in which an amino terminal is capped with nadic acid anhydride or ethynyl phthalic anhydride having a radically polymerizable unsaturated bond; and the like can be exemplified.

As the radically polymerizable unsaturated compound, a low molecular or high molecular compound having a partial structure reactive with the epoxy resin, as well as a radically polymerizable unsaturated bond can also be used. By using such a compound, a chemical bond is formed between the epoxy resin and a compound having the radically polymerizable unsaturated bond in the cured product, thereby improving morphology and physical properties.

As the partial structure reactive with the epoxy resin, an epoxy group, a carboxyl group, a hydroxyl group, an alkoxy methyl group, the primary or secondary amine, amide, 1,2-dicarboxylic acid anhydride structure, nitrogen-containing heterocycle and the like can be exemplified.

In a case of using a single compound, it is preferable to use a compound having a plurality of radically polymerizable unsaturated bonds in the molecule, since the high molecular weight component generated by radical polymerization on the surface of the prepreg has a cross-linked structure and a remarkable viscosity increasing effect can be obtained on the surface of the prepreg, as described later. As a compound having a plurality of radically polymerizable unsaturated bonds, a compound having an epoxy group and a carboxyl group; a compound having an epoxy group and a hydroxyl group; and a compound having a carboxyl group and a hydroxyl group are more preferable. The abovementioned compounds are compatible with the epoxy resin when used together.

On the other hand, in a case of using two or more compounds by blending, a compound having a plurality of radically polymerizable unsaturated bonds in the molecule is preferably included in an amount of 50 to 99% by mass, and more preferably 60 to 90% by mass, with respect to the radically polymerizable unsaturated compound being 100% by mass.

The content of the radically polymerizable unsaturated compound is 5 to 25% by mass with respect to a total of the epoxy resin and the radically polymerizable unsaturated compound being 100% by mass. If the content of the radically polymerizable unsaturated compound is smaller than 5% by mass, the tack property of the surface of the prepreg becomes excessive after going through a surface viscosity increasing step (described later).

On the other hand, if the content of the radically polymerizable unsaturated compound is greater than 25% by mass, the tack property of the surface of the prepreg becomes insufficient. This may reduce a cure extent, strength, heat resistant property, and interlayer binding strength when a cured product (fiber reinforced composite material) in which a plurality of prepregs are laminated and cured is obtained.

The content of the radically polymerizable unsaturated compound is preferably 5 to 20% by mass, and more preferably 5 to 15% by mass, with respect to a total of the epoxy resin and the radically polymerizable unsaturated compound being 100% by mass.

[Curing Agent for Epoxy Resin]

Amine, acid anhydride (for example, carboxylic acid anhydride), phenol (for example, novolak resin), mercaptan, Lewis acid-amine complex, onium salts, imidazole and the like are used as a curing agent for the epoxy resin used for the prepreg and the method for producing the prepreg of the present invention, but those having any structure may be used as long as it can cure the epoxy resin. Among these, the amine type curing agent is preferable. The curing agents may be used singly or in combination of two or more.

The amine type curing agent includes: aromatic amine such as diaminodiphenyl methane and diaminodiphenyl sulfone; aliphatic amine; imidazole derivatives; dicyandiamide; tetramethylguanidine; and thiourea added amine, as well as isomers and modified forms thereof. Among these, dicyandiamide, which provides a superior preserving property to the prepreg, is particularly preferable.

The content of the curing agent for the epoxy resin is preferably such that a ratio of active hydrogen equivalent of the curing agent is 0.3 to 1 with respect to 1 epoxy equivalent of the epoxy resin. If the ratio of active hydrogen equivalent is at least 0.3, the curing agent can cure the epoxy resin. If the ratio of active hydrogen equivalent is no greater than 1, the toughness of a cured product of the matrix resin composition can be increased. The ratio of active hydrogen equivalent is more preferably 0.4 to 0.8. In this range, a runaway reaction due to heat generation and heat accumulation during curing can be suppressed upon producing a large sized molded product.

A curing aid can also be used for increasing curing activity. The curing aid can be any agent having an effect of increasing the curing activity of the curing agent. For example, in a case in which the curing agent is dicyandiamide, the curing aid is preferably a urea derivative such as 3-phenyl-1,1-dimethylurea, 3-(3,4-dichlorophenyl)-1,1-dimethylurea (DCMU), 3-(3-chloro-4-methylphenyl)-1,1-dimethylurea, 2,4-bis(3,3-dimethylureide) toluene and the like.

In a case in which the curing agent is a carboxylic acid anhydride or a novolak resin, the curing aid is preferably a tertiary amine. In a case in which the curing agent is diaminodiphenyl sulfone, the curing aid is preferably: an imidazole compound; a urea compound such as phenyldimethylurea (PDMU); and an amine complex such as monoethylamine trifluoride and an amine trichloride complex.

Among these, a combination of dicyandiamide and DCMU is particularly preferable.

The content of the curing aid is preferably 1 to 20% by mass and more preferably 2 to 6% by mass with respect to 100% by mass of the entire epoxy resin. A content of at least 1% by mass can provide an effect of lowering a curing reaction temperature of the epoxy resin by the curing agent. On the other hand, a content of no greater than 20% by mass can suppress reduction in heat resistant property due to a curing reaction at a low temperature and a runaway reaction due to heat generation and heat accumulation during curing upon producing a large sized molded product.

[Polymerization Initiator Generating Radicals]

A polymerization initiator used for the prepreg and the method for producing the prepreg is a polymerization initiator that generates radicals. As used herein, a stimulus is one that can make a composition having low binding energy generate radicals under relatively mild reaction conditions, and that can control generation of radicals as an industrial process. Such a stimulus includes irradiation of energy wave, heating, vibration, and the like.

In a case in which irradiation of energy wave is employed as the stimulus for generating radicals, the polymerization initiator can be a compound that develops a reaction such as cleavage, hydrogen abstraction, electron transfer and the like in response to the irradiation of the energy wave. Such a compound includes a dihalogen compound, an azo compound, an alkylphenone compound and the like. The compounds may be used singly or in combination of two or more.

The energy wave is not particularly limited as long as it can make the polymerization initiator develop the abovementioned reactions; however, at least one energy wave selected from a group consisting of: ultraviolet, infrared, visible light, and electron beam, is preferable. The energy amount of the energy wave can be selected as appropriate to progress the abovementioned reactions. Among these, so-called light is more preferable.

In a case of employing light as the stimulus, the polymerizaton initiator is preferably an alkylphenone compound. An alkylphenone compound is easily cured by light of relatively low intensity (for example, ultraviolet) and in a relatively short period of irradiation. Among alkylphenone compounds, α-aminoalkylphenone compound or α-hydroxyalkylphenone compound is more preferable.

The α-aminoalkylphenone compound includes: 2-methyl-1-[4(methylthio)phenyl]-2-morpholino-propan-1-one (for example, Irgacure907 manufactured by BASF); 2-benzyl-2-dimethylamino-1-(4-morpholino phenyl)-1-butanone (for example, Irgacure369 or 1300 manufactured by BASF); 2-dimethylamino-2-(4-methylbenzyl)-1-(4-morpholino phenyl)-1-butanone (for example, Irgacure379 manufactured by BASF); 3,6-bis(2-methyl-2-morpholinopropionyl)-9-octylcarbazol (for example, Adekaoptomer N-1414 manufactured by ADEKA Corporation); and the like.

The α-hydroxyalkylphenone compound includes: 1-hydroxy-cyclohexyl-phenyl-keton (for example, Irgacure184 manufactured by BASF); 2-hydroxy-2-methyl-1-phenyl-propan-1-one (for example, DAROCURE1173 manufactured by BASF); 1-[4-(2-hydroxyethoxy)-phenyl]-2-hydroxy-2-methyl-1-propan-1-one (for example, IRGACURE2959 manufactured by BASF); 2-hydroxy-1-{4-[4-(2-hydroxy-2-methyl-propionyl)-benzyl]phenyl}-2-methyl-propan-1-one (for example, IRGACURE127 manufactured by BASF); and the like.

In a case of using the alkylphenone compound, the content thereof is preferably 0.5 to 4 parts by mass with respect to a total of the epoxy resin, the radically polymerizable unsaturated compound, and the curing agent being 100 parts by mass. If the content of the polymerization initiator is at least 0.5 parts by mass, curing time upon producing the fiber-reinforced composite material can be shortened. On the other hand, if the content of the polymerization initiator is no greater than 4 parts by mass, the heat resistant property of the cured product of the resin composition can be improved. In addition, leakage of the remaining radical generating agent from the cured product of the matrix resin composition can be suppressed.

In a case in which heating is employed as the stimulus for generating radicals, the polymerization initiator can be a compound that develops a reaction such as cleavage, hydrogen abstraction, electron transfer and the like in response to heat. Such a compound includes an azo compound, peroxide, and the like. The compounds may be used singly or in combination of two or more.

Such a polymerization initiator includes: 4,4'-azobis (4-cyanovaleric acid); 2,2'-azobis(2,4-dimethylvaleronitrile); 2,2'-azodiisobutyronitrile; 2,2'-azobis(2-methyl butyronitrile); 2,2'-azobis(2-methylpropionic acid) dimethyl; dibenzoyl peroxide; tert-butylhydroperoxide; α,α-dimethylbenzyl hydroperoxide; tert-butylperoxide; and the like.

[Other Components]

The matrix resin composition can include at least one resin selected from a group consisting of: a thermoplastic resin; thermoplastic elastomer; and elastomer, as necessary, to such a degree that the effects of the present invention are not reduced. These resins have a function of improving toughness and changing viscoelasticity of the resin composition to make viscosity, storage elastic modulus, and thixotropy thereof appropriate. These resins can be either blended with various components or dissolved in the epoxy resin in advance.

The thermoplastic resin preferably has a bond selected from a group consisting of: a carbon-carbon bond, an amide bond, an imide bond, an ester bond, an ether bond, a carbonate bond, a urethane bond, a urea bond, a thioether bond, a sulfone bond, an imidazol bond and a carbonyl bond, in a main chain. As such a thermoplastic resin, a group of thermoplastic resins falling under engineering plastics such as polyacrylate, polyamide, polyaramide, polyester, polycarbonate, polyphenylene sulfide, polybenzimidazole, polyimide, polyetherimide, polysulfone and polyethersulfone can be exemplified. Among these, polyimide, polyetherimide, polysulfone and polyethersulfone, which are superior in heat resistant property, are particularly preferable.

From the viewpoint of increasing toughness and maintaining an environmentally resistant property of the cured resin, it is preferable that the thermoplastic resin has a functional group reactive with the thermally curable resin. Particularly preferable functional group includes a carboxylic group, an amino group, a hydroxyl group, and the like.

The matrix resin composition can include a solid additive as other components, as long as the solid additive is in a liquid state at the moment of impregnation of the reinforcing fiber. As the additive, inorganic particles such as silica, alumina, titanium oxide, zirconia, clay minerals, talc, mica, and ferrite; and carbonaceous component such as carbon nanotube and fullerene, can be exemplified. These additives provide an effect of: adding thixotropy to an uncured resin composition; improving elasticity and heat resistant property of a cured product of the resin composition; and improving fatigue strength and abrasion resistant property. In addition, particles of metal, carbon black, copper oxide, tin oxide and the like can be included in order to improve conductivity. The content of the solid additive is preferably no greater than 50% of the mass of the matrix resin composition.

(Method for Producing Prepreg)

The method for producing a prepreg of the present invention is described hereinafter. The method for producing according to the present invention comprises the following steps.

(1) matrix resin composition blending step;
(2) matrix resin composition impregnating step; and
(3) surface viscosity increasing step.

[(1) Matrix Resin Composition Blending Step]

This is a step for obtaining the matrix resin composition. The matrix resin composition can be obtained by blending components simultaneously. Alternatively, the resin composition can be obtained by: firstly preparing a curing agent masterbatch by blending the epoxy resin, the curing agent, and as necessary the curing aid; preparing separately a polymerization initiator masterbatch by blending the epoxy resin and the polymerization initiator; and then blending the curing agent masterbatch, the polymerization initiator masterbatch, the epoxy resin, and the radically polymerizable unsaturated compound.

In a case of using the thermoplastic resin, the thermoplastic elastomer, the elastomer and the like as the other components, these components can be dissolved or dispersed in the component (A) in advance.

As described above with regard to the matrix resin, the types and contents of the components are selected according to various requirements. As described above with regard to the matrix resin, the content of the radically polymerizable unsaturated compound is required to be 5 to 25% by mass with respect to the total of the epoxy resin and the radically polymerizable unsaturated compound being 100% by mass. For blending, blending machines such as a triple roll mill, a planetary mixer, a kneader, a universal mixer, a homogenizer, a homo disperser and the like can be used.

[(2) Matrix Resin Composition Impregnating Step]

In this step, the prepreg precursor is obtained by impregnating the reinforcing fiber assembly with the matrix resin composition. The weight per square meter of the reinforcing fiber assembly used in this step is 250 to 2,000 g/m².

As the reinforcing fiber, various inorganic fibers or organic fibers can be used. For example, carbon fiber, graphite fiber, aramid fiber, nylon fiber, high strength polyester fiber, fiberglass, boron fiber, alumina fiber, silicon nitride fiber can be used. Among these, carbon fiber and graphite fiber are preferably used. Carbon fiber and graphite fiber are high in specific strength and specific elastic modulus. As the carbon fiber and graphite fiber, various carbon fiber and graphite fiber can be used according to use. High strength carbon fiber with a tensile elongation of at least 1.5% is preferably used. High strength carbon fiber with a tensile strength of at least 4.4 GPa and a tensile elongation of at least 1.7% is more preferable, and high strength carbon fiber with a tensile elongation of at least 1.9% is most suitable.

The reinforcing fiber assembly can be in a form of: a bundle of consecutive reinforcing fiber; a plurality of consecutive reinforcing fiber bundles aligned in one direction; a fabric; a braid; a non-crimping fabric; and the like. A form in which a plurality of consecutive reinforcing fiber bundles are aligned in one direction is preferable, since such a form can increase strength of the fiber-reinforced composite material. In addition, the reinforcing fiber assembly can be in a form in which a plurality of bundles of continuous fiber is aligned in one direction, either without interval or with intervals. The reinforcing fiber assembly can be configured in the above described forms by respective well-known methods.

Next, the reinforcing fiber assembly is impregnated with the matrix resin composition thus obtained in the matrix resin composition blending step, in order to obtain the prepreg precursor. Here, it is preferable to impregnate the reinforcing fiber assembly with the matrix resin composition such that the prepreg precursor includes substantially no void. A method of impregnation is not particularly limited and any well-known method can be employed; however, it is preferable to use the following method.

A viscosity of the matrix resin composition at 30° C. is preferably 12 Pa·s to 40,000 Pa·s, and more preferably 40 Pa·s to 3,000 Pa·s. If the lower limit of the viscosity is lower than 12 Pa·s, handling property is deteriorated and the matrix resin composition becomes difficult to process. The lower limit of the viscosity is more preferably 50 Pa·s, and further more preferably 60 Pa·s. An upper limit of the viscosity of greater than 40,000 Pa·s is not preferable, since impregnation of the reinforcing fiber with the matrix resin composition is inhibited and heating is required. The upper limit of the viscosity is more preferably 20,000 Pa·s and further more preferably 10,000 Pa·s.

Upon impregnation of the reinforcing fiber assembly with the matrix resin composition, it is preferable to first apply the matrix resin composition to the reinforcing fiber assembly and then to pressurize to impregnate the reinforcing fiber assembly with the matrix resin composition. A method of application of the matrix resin composition can be any well-known method, for example a touch roller method, a dipping method, a dyeing method, a dispenser method and the like. An amount of application of the matrix resin composition is adjusted according to requirements of the fiber-reinforced composite material. The amount is, for example, 25 to 50% with respect to the mass of the prepreg. A method of pressurization can be any well-known method, for example a method of interposing the reinforcing fiber assembly between a pair of rollers and pressurize, a method of wrapping around a plurality of rollers and circulating to impregnate; and the like.

On a superficial layer of the prepreg, at least one resin selected from a group consisting of: a thermoplastic resin; thermoplastic elastomer; and elastomer can be disposed in a form of microparticles, long fibers, short fibers, a fabric, a non-woven fabric, a mesh, pulp and the like as necessary, to such a degree that the effects of the present invention is not reduced.

It is preferable that the matrix resin composition impregnating step includes the following steps (2-i) to (2-iii) in order to continuously and effectively impregnate the reinforcing fiber assembly with the matrix resin composition.

(2-i) a matrix resin composition applying step of applying the matrix resin composition to a first face of a first reinforcing fiber base material A1, which is composed of consecutive reinforcing fiber bundles in a sheet-like shape;

(2-ii) a reinforcing fiber laminating step of laminating a second reinforcing fiber base material A2, which is composed of consecutive reinforcing fiber bundles in a sheet-like shape, onto the face of the A1 to which the matrix resin composition has been applied; and (2-iii) a pressurizing step of obtaining the prepreg precursor by impregnating the A1 and the A2 with the matrix resin composition by pressurizing the A1 and A2.

FIG. 1 is a schematic view showing an example of a production flow including these steps. The prepreg producing device illustrated in FIG. 1 comprises the following components:

an application unit 12 that applies the matrix resin composition to the reinforcing fiber sheet A1 (11a);

a pressurization unit 13 that impregnates the A1 (11a) and the reinforcing fiber sheet A2 (11b) with the matrix resin composition that has been applied to the A1 (11a), the pressurization unit including a pair of pressurization rollers 13a, 13b which can be heated; and a protection sheet supply roller 14 that supplies a protection sheet to the A1 and the A2; and a protection sheet winding roller 15 that removes and winds the protection sheet from the prepreg precursor.

[(2-i) Matrix Resin Composition Applying Step]

In this step, the matrix resin composition is applied to a first face of the first reinforcing fiber sheet A1 (11*a*) composed of consecutive reinforcing fiber bundle. In an example shown in FIG. 1, the A1 (11*a*) is driven by a roller and continuously conveyed to a rear side. The application unit 12 includes a die 12*a* and extrudes the matrix resin composition, which is supplied from a resin bath (not illustrated), from the die 12*a* to apply to the A1 (11*a*). It should be noted that, although the die 12*a* is used in this example, other methods can also be employed.

[(2-ii) Reinforcing Fiber Sheet Laminating Step]

In this step, the second reinforcing fiber sheet A2 (11*b*) composed of consecutive reinforcing fiber bundles onto the face of the A1 (11*a*) to which the matrix resin composition has been applied. In an example shown in FIG. 1, the A2 (11*b*) is arranged above the application unit 12, driven by a roller and continuously conveyed to a rear side. And then, in a front side of the pressurization rollers 13*a*, 13*b*, the A2 (11*b*) is laminated onto the face of the A1 (11*a*) to which the matrix resin composition has been applied. Here, the A1 (11*a*) and the A2 (11*b*) are in a state of being laminated with the matrix resin composition being interposed therebetween.

[(2-iii) Pressurizing Step]

In this step, the prepreg precursor is obtained by impregnating the A1 and the A2 with the matrix resin composition by pressurizing the A1 and A2. The weight per square meter of the reinforcing fiber assembly in the prepreg precursor thus obtained is 250 to 2,000 g/m². In other words, the weight of the A1 and the A2 can be adjusted according to this weight. In addition, a compression force of the pressurization rollers is preferably $6.7 \times 10^3$ N to $180.0 \times 10^3$ N, and more preferably $20.0 \times 10^3$ N to $133.3 \times 10^3$ N for every 1 m width of the prepreg precursor.

In the example of FIG. 1, the A1 (11*a*) and the A2 (11*b*) that are laminated is interposed and pressurized between the pressurization rollers 13*a* and 13*b* as the pressurization unit 13, thereby impregnating with the matrix resin composition. In the example of FIG. 1, three pairs of the pressurization rollers 13*a* and 13*b* are arranged; however, the present invention is not limited thereto. If the pressurization unit 13 is configured to allow temperature control, impregnation conditions of the matrix resin composition can be controlled more precisely. A well-known configuration can be employed as such a configuration. For example, a configuration allowing a heating medium such as hot water to be introduced thereinto, a configuration with a heater provided on a surface thereof, and the like can be employed.

By thus pressurizing the A1 (11*a*) and the A2 (11*b*) in a state of being laminated with the matrix resin composition being interposed therebetween, the matrix resin composition migrates outward from the inside of the A1 (11*a*) and the A2 (11*b*). This facilitates evacuation of air from spaces in the reinforcing fiber assembly. As a result, the prepreg precursor thus obtained has substantially no void. On the other hand, in the above described hot melt film method, the direction of migration of the matrix resin composition is from outside to inside of the reinforcing fiber assembly. This prevents the air from evacuating from spaces in the reinforcing fiber assembly. In other words, by employing the above described steps (2-i) to (2-iii), impregnation with the matrix resin composition can be performed while generating substantially no void, with a lower pressure.

In the example of FIG. 1, the protection sheet supply roller 14 and the protection sheet winding roller 15 are arranged in front of and behind the pressurization unit 13. The use of the protection sheet is not obligatory, but optional. A sheet of a material that is conventionally used as mold release paper, for example, can be used as the protection sheet. The protection sheet protects the A1 and the A2 that are interposed between the pressurization rollers 13*a* and 13*b*, while preventing leakage of the matrix resin composition from the A1 and the A2.

Alternatively, it is preferable that the a matrix resin composition impregnating step includes the following steps (2-iv) to (2-vi) instead of the abovementioned steps (2-i) to (2-iii), in order to continuously and effectively impregnate the reinforcing fiber assembly with the matrix resin composition.

(2-iv) a matrix resin composition applying step of applying the matrix resin composition to a first reinforcing fiber sheet A1 composed of consecutive reinforcing fiber bundle;

(2-v) a reinforcing fiber matrix laminating step of laminating a second reinforcing fiber sheet A2 and a third reinforcing fiber sheet A3 composed of consecutive reinforcing fiber bundles, onto a first face of the A1 and a second face of the A1 respectively; and (2-vi) a pressurizing step of obtaining the prepreg precursor by impregnating the A1, the A2, and the A3 with the matrix resin composition by pressurizing the A1, the A2, and the A3.

[(2-iv) Matrix Resin Composition Applying Step]

In this step, the matrix resin composition is applied to the first reinforcing fiber sheet A1 composed of consecutive reinforcing fiber bundles. Here, the matrix resin composition can be applied to either one face or both faces of the A1; however, it is preferable to apply the matrix resin composition to one face in order to facilitate evacuation of air in the pressurizing step. The application is specifically performed in a similar way as the abovementioned step (2-i).

[(2-v) Reinforcing Fiber Sheet Laminating Step]

In this step, a second reinforcing fiber sheet A2 and a third reinforcing fiber sheet A3 are composed of consecutive reinforcing fiber bundles, and the A2 is laminated onto a first face of the A1 and the A3 is laminated onto a second face of the A1. This step is different from the above described step (2-ii) in that the A1 is interposed between two reinforcing fiber sheets, in other words the A2 and the A3. Also in this configuration, the reinforcing fiber assembly obtained is in a state of being laminated with the matrix resin composition being interposed therebetween, as in the case of performing the abovementioned step (2-ii).

It is easily understood by those skilled in the art that the above described step (2-ii) can be applied as a method for laminating the reinforcing fiber sheets. For example, the A2 can be arranged above the application unit 12 and the A3 can be arranged below the A1, or vice versa.

[(2-vi) Pressurizing Step]

In this step, the prepreg precursor is obtained by impregnating the A1, the A2 and the A3 with the matrix resin composition by pressurizing the A1, the A2 and the A3. As in a case of performing the above described pressurizing step of (2-iii), by pressurizing the A1, the A2 and the A3 that are laminated, the matrix resin composition migrates outward from the inside of the reinforcing fiber assembly. This also facilitates evacuation of air from spaces in the reinforcing fiber assembly. It should be noted that it can be easily understood that a similar effect can be obtained even in a case of using more than three reinforcing fiber sheets being laminated. Therefore, the present invention also encompasses a configuration in which another reinforcing fiber sheet is further laminated on the A2 and the A3.

The method of the above described (2-iii) can be applied as a method for realizing this step.

As described above, the weight per square meter of the reinforcing fiber assembly in the prepreg precursor thus obtained is 250 to 2,000 g/m$^2$ and the weight of the A1, the A2 and the A3 can be adjusted according to this weight. In addition, a compression force of the pressurization rollers is preferably 6.7×10$^3$ N to 180.0×10$^3$ N, and more preferably 20.0×10$^3$ N to 133.3×10$^3$ N for every 1 m width of the prepreg precursor.

[(3) Surface Viscosity Increasing Step]

In this step, a prepreg is obtained in which viscosity of the matrix resin composition is increased more in a superficial part than in a central part, by stimulating the prepreg precursor obtained by the (1) matrix resin composition blending step and (2) matrix resin composition impregnating step, letting the polymerization initiator present in the superficial part of the prepreg precursor generate a radical, while not letting the polymerization initiator present in the central part generate a radical.

Here, the "central part" indicates a region at a depth of at least 40%, with respect to the thickness of the prepreg precursor being 100%, from the surface of the prepreg precursor.

Here, the "superficial part" indicates a region more on the outside than the fibers closest to a superficial layer.

After generation of radical, a viscosity of the central part of the prepreg at 30° C. is preferably 12 Pa·s to 40,000 Pa·s, and a viscosity of the superficial part of the prepreg is preferably 3,000 Pa·s to 4000,000 Pa·s. The viscosity of the central part of the prepreg is more preferably 40 Pa·s to 3,000 Pa·s, and a viscosity of the superficial part of the prepreg is preferably 9,000 Pa·s to 1500,000 Pa·s. A prepreg that is superior in a tack property and flexibility can thus be obtained.

In a case in which irradiation of energy wave is employed as the stimulus for generating radicals, a degree of increase in viscosity is determined by a synergy of: an amount of irradiated energy; reactivity of a monomer and oligomer; reactivity of resin composition; an absorption coefficient and thickness of the prepreg precursor; and the like. Therefore, conditions of irradiation can be set according to these factors.

In a case in which light is employed as the stimulus, the light is absorbed according to the so-called Beer-Lambert law. In other words, given Io being intensity of light before being incident and I being intensity of the light after having passed through a sample, a relationship Log(Io/I)=e.c.d is satisfied. Therefore, by irradiating the light under such a condition that I in the relationship becomes substantially 0 at a particular depth, a degree of increase in surface viscosity can be controlled.

In this step, it is preferable to apply the abovementioned stimulus by the following method (3-i). (3-i) a method of irradiating the prepreg precursor with at least one energy wave selected from a group consisting of: ultraviolet; infrared; visible light; and electron beam, with an incident intensity no greater than such an incident intensity that transmittance becomes 0% at a depth of 40% from a surface of the prepreg precursor with respect to a thickness of the prepreg precursor being 100%.

It should be noted that carbon fiber and graphite fiber do not allow light to pass therethrough. Given this, these fibers are particularly suitable as the reinforcing fiber for a case of employing light as stimulus, in order to increase viscosity only in the superficial part.

In a case in which heating is employed as the stimulus for generating radicals, a degree of increase in viscosity is determined by a synergy of: an amount of thermal energy; reactivity of a monomer and oligomer; reactivity of resin composition; a heat conductivity and thickness of the prepreg precursor; and the like. Therefore, conditions of heating can be set according to these factors.

In this step, it is preferable to apply the abovementioned stimulus by the following method (3-ii). (3-ii) a method of heating the prepreg precursor from the outside in a non-contact state, for such a time period that a rate of temperature change becomes 0% at a depth of 40% from a surface of the prepreg precursor with respect to a thickness of the prepreg precursor being 100%.

Here, the "non-contact state" indicates a state in which no contact is made. It should be noted that carbon fiber and graphite fiber are relatively high in heat conductivity. Therefore, in a case of increasing viscosity only in the superficial part, it is preferable to perform instantaneous heating in as short period of time as possible, preferably by high frequency heating such as laser heating, electromagnetic heating and the like. Here, the high frequency heating indicates a heating method utilizing an exothermic phenomenon by high frequency electromagnetic wave. The frequency used is at least 100 Hz and a heating time can be set so as to reach a temperature at which a desired initiator generates radicals.

In the prepreg obtained by performing the above described (3) surface viscosity increasing step, the viscosity of the matrix resin composition is increased more in the superficial part than in the central part. Therefore, even a heavyweight prepreg with a weight per square meter of the reinforcing fibers being 250-2,000 g/m$^2$ can be flexible to such a degree that the prepreg can follow a curve when being placed on a mold material which is curved, and can have a tack property of such a degree that the prepreg can be rearranged after laminating the prepregs.

The fiber-reinforced composite material obtained by curing the prepreg has superior mechanical properties and can thus be preferably used for large sized structures such as aircraft, automobile, ship, construction, windmills and the like.

Figure 5:
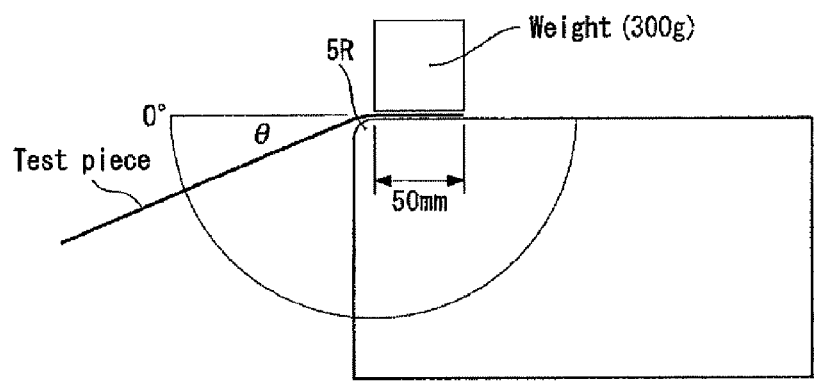
FIG. 5 is a cross-sectional view illustrating a method of measuring for evaluation of a bending property.

The flexibility of the prepreg is preferably set such that a bowing angle θ of the prepreg under its own weight that is measured by a method in the evaluation of a bending property later described in FIG. 5 is at least 30° and more preferably at least 40°.

(Fiber-Reinforced Composite Material)

The fiber-reinforced composite material of the present invention can be obtained by curing the above described prepreg. As a method of curing the prepreg, autoclave molding, vacuum bag molding and the like can be exemplified.

EXAMPLES

The present invention will be described in more detail by way of examples, which are however not intended to limit the present invention.

Materials (resins and the like), reinforcing fibers, as well as measuring methods and evaluation methods used in the following examples are listed hereinafter.

(Materials)
[Epoxy Resin (Hereinafter Referred to as Component (A))]
A-1: bisphenol A-type liquid epoxy resin (jER828 manufactured by Mitsubishi Chemical Corporation)
A-2: bisphenol A-type solid epoxy resin (jER1001 manufactured by Mitsubishi Chemical Corporation)
A-3: isocyanate modified epoxy resin (AER4152 manufactured by Asahi Kasei Epoxy K.K.)
[Radically Polymerizable Unsaturated Compound (Hereinafter Referred to as Component (B))]
B-1: bisphenol-A diglycidyl ether acrylic acid adduct (Epoxy Ester 3000A manufactured by Kyoeisha Chemical Co., Ltd.)
B-2: novolak type glycidyl ether acrylic acid adduct (DICLITE UE-8740 manufactured by DIC Corporation)
[Curing Agent (Hereinafter Referred to as Component (C))]
C-1: dicyandiamide (Dicy 15 manufactured by Mitsubishi Chemical Corporation)
[Curing Aid]
DCMU: diphenyl dimethylurea (DCMU99 manufactured by Hodogaya Chemical Co., Ltd.)
[Radical Polymerization Initiator (Hereinafter Referred to as Component (D))]
D-1: α-aminoalkylphenone (Irgacure379 manufactured by BASF)
D-2: α-aminoalkylphenone (Irgacure369 manufactured by BASF)
D-3: α-aminoalkylphenone (Irgacure907 manufactured by BASF)
D-4: α-hydroxyalkylphenone (Irgacure184 manufactured by BASF)
(Reinforcing Fiber Bundle)
Carbon fiber bundle 1: tensile strength 4.90 GPa, tensile elastic modulus 240 GPa, filament number 15,000, weight per meter 1 g/m (manufactured by Mitsubishi Rayon Co., Ltd.)
Carbon fiber bundle 2: tensile strength 4.90 GPa, tensile elastic modulus 250 GPa, filament number 60,000, weight per meter 3.2 g/m (manufactured by Mitsubishi Rayon Co., Ltd.)
Carbon fiber bundle 3: tensile strength 4.2 GPa, tensile elastic modulus 235 GPa, filament number 50,000, weight per meter 3.8 g/m (manufactured by Mitsubishi Rayon Co., Ltd.)
(Measuring and Evaluation Methods)
[Measurement of Viscosity of Resin Composition Under Ultraviolet Irradiation]
Viscosity change of the resin composition by the ultraviolet irradiation was measured under the following measurement conditions.
Measuring device: VAR-100 (manufactured by Reologica Instruments A.B.)
Test mode: high speed oscillation
Measuring temperature: 30° C.
Plate size: 8 mmφ
Gap: 0.05 mm
Stress: 700 Pa
Frequency: 1.59 Hz
Ultraviolet ray intensity (A=365 nm): 53 mW/cm$^2$
Irradiation time: 6.0 sec
Number of irradiations and interval between viscosity measurements: after measuring the pre irradiation resin viscosity, ultraviolet rays were irradiated once and, after an interval of 120 sec, post irradiation resin viscosity was measured.
[Measurement of Viscosity of Resin Composition]
The viscosity of the resin composition was measured under the following measurement conditions.

Figure 3:
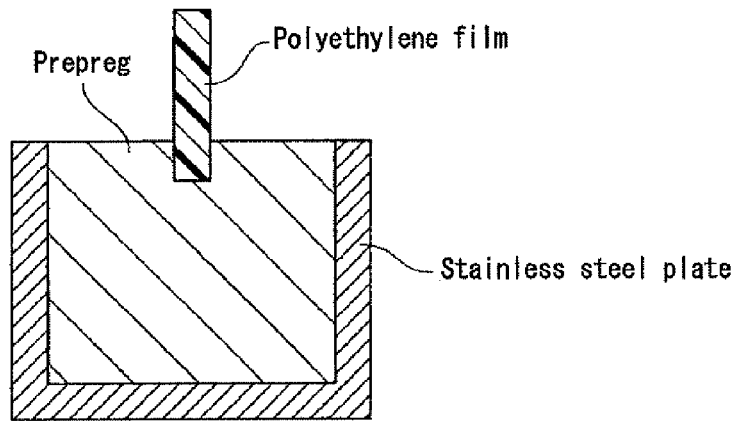
FIG. 3 is a front view illustrating a method of measuring for evaluation of a tack property.
Figure 4:
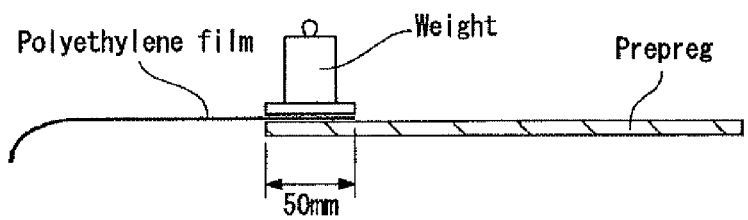
FIG. 4 is a cross-sectional view illustrating a method of measuring for evaluation of a tack property.

Measuring device: Rheometer (DSR-200 manufactured by TA Instruments)
Plate: 40φ parallel plate
Plate gap: 0.5 mm
Measurement frequency: 10 rad/sec
Heating rate: 2° C./min
Stress: 3000 dyne/cm$^2$
[Evaluation of Impregnation Property of Prepreg]
The prepreg obtained was visually observed and impregnation with the resin composition was evaluated on the following two point scale.
Circle: non-impregnated part was not observed.
Cross: non-impregnated part was observed.
[Evaluation of Tack Property of Prepreg (Sensory Evaluation)]
Tack property of the prepreg was evaluated on the following four point scale based on a tactile sensation of the prepreg and a position correction property between prepregs.
Double circle: Tack property is moderate and position can be smoothly corrected
Circle: Slight stickiness is observed but position correction is possible
Cross (Low): Substantially no tackiness is observed
Cross (High): Tackiness is extremely high and resin sticks to a hand; or position of the prepreg cannot be corrected while maintaining shape
[Evaluation of Tack Property]
Measurement was conducted as follows: a polyethylene film was attached to the prepreg as shown in FIG. 3 such that an area of contact is 50 mm in width and 50 mm in length; a weight was placed thereonto as shown in FIG. 4 such that a load is evenly distributed in the area; and 60 seconds later, the weight was removed, then the polyethylene film and the prepreg were gently raised vertically, and the time for the polyethylene film to be detached was measured. The tack property of the prepreg was determined from the time thus measured. The test was repeated using nine weights of 5, 7, 15, 30, 60, 150, 300, 600 and 1,200 g sequentially in this order, until the polyethylene film was not detached within 10 seconds after being raised vertically. When the polyethylene film was not detached within 10 seconds, the load of the weight used was used as an index for the tack property. If the polyethylene film was detached even with the 1,200 g weight, this load was used as the index for the tack property. The measurement of the tack property was conducted for three times and an average was obtained.
Three prepregs of 35 cm in length and 20 cm in width were used in a state of being laminated. In addition, a stainless plate of 1 mm in thickness, 35 cm in length, and 20 cm in width was placed below the prepreg in order to prevent distortion of the prepreg.
Polyethylene film: polylon film LD (trade name) manufactured by HiroSekikako K.K., 25 μm in thickness, 50 mm in width, 250 mm in length
[Evaluation of Drapability]
Two prepreg pieces of 0° direction and 90° direction, 50 mm in width and 300 mm in length were cut from the same prepreg; the prepreg piece of 90° was laminated on the prepreg piece of 0° to obtain a test piece; and the test piece was left for 60 minutes under conditions of 23° C. and 50% humidity.
By using an apparatus as shown in FIG. 5, a weight of 300 g was placed on the test piece such that a load is evenly distributed in an area of 50 mm in length from an end of the test piece and 50 mm in width; and the test piece was left. Three minutes later, an angle of bend of the test piece was measured by using a protractor as an index for the drapability. An average of results of three measurements was used as the index for the drapability.

[Evaluation of Bonding Property]

A bonding property of the prepreg was evaluated in the following method. Two prepregs, which had been cut in a size of 150 mm in a longitudinal direction and 50 mm in a width direction of the reinforcing fiber included in the prepregs, were left for at least 30 minutes at a room temperature of 23° C. and 50% humidity; and the prepregs were laminated on one another with a mold release film interposed therebetween, in order to avoid sticking therebetween. The mold release film was removed from an area of 50 mm in length from an end and 50 mm in width (the area hereinafter referred to as a bonding area) and the rest was defined as a non-bonding area. By using a universal testing machine (Model 5565, manufactured by Instron), a pressure of 30 N/25 cm$^2$ was applied to the entire bonding area for 1 minute for pressure bonding. A state of bonding was evaluated on the following two point scale.

Circle: the prepregs maintained a state of being bonded to each other upon raising the sample by holding the non-bonding area of one of the prepregs.

Cross: the prepregs were separated at the bonding area.

[Evaluation of Position Correction Property]

The non-bonding area of the two prepregs joined by the same method as in the evaluation of bonding property was raised, the prepregs were separated to a vertical direction with respect to a contact surface at a rate of 10 mm/sec, and a shape retention state of the prepregs was evaluated on the following two point scale.

Circle: the shape and the surface state of the prepreg were retained.

Cross: the shape or the surface state of the prepreg was deteriorated.

[Evaluation of Flexibility of Prepreg]

The produced prepreg was bent by fingers and observed, and flexibility of the prepreg was evaluated based on the observation on the following two point scale.

Circle: the prepreg was very flexible and readily followed a mold material with curves.

Cross: the prepreg was rigid and hard, and hardly followed a mold material with curves.

[Production of Fiber-Reinforced Composite Material]

[Autoclave Curing]

A predetermined number of uni-directional prepregs were layered in the same fiber direction, and bagged. The inside of the bag was depressurized by a vacuum pump and an autoclave was loaded with the bag. The temperature inside of the autoclave was raised at a rate of 2° C./min and maintained at 80° C. for 1 hour. And then the temperature was raised at a rate of 2° C./min and maintained at 130° C. for 1.5 hours, to thereby cure and obtain the fiber-reinforced composite material. During this process, pressurization took place after maintaining at 80° C. for 1 hour, to thereby make the pressure inside the autoclave 6.0 kg/cm$^2$. The vacuum pump was stopped when the pressure inside the autoclave was 1.4 kg/cm$^2$, and the bag was opened to the atmosphere.

[Vacuum Bag Curing]

A predetermined number of uni-directional prepregs were layered in the same fiber direction, and bagged. The inside of the bag was depressurized by a vacuum pump and an oven was loaded with the bag. The temperature inside of the oven was raised at a rate of 0.5° C./min and maintained at 90° C. for 2 hours. And then the temperature was raised at a rate of 0.17° C./min and maintained at 110° C. for 4 hours, to thereby cure and obtain the fiber-reinforced composite material.

[Evaluation of Fiber-Reinforced Composite Material]

[Evaluation of 0° Compression Property]

2 plies of the prepreg were layered and bagged. The inside of the bag was depressurized by a vacuum pump, and then the autoclave curing or the vacuum bag curing took place to obtain six pieces of the fiber-reinforced composite material (test pieces) of 12.7 mm in width and 1 mm in thickness. Using INSTRON 5882 as a measuring device, which is compliant with SACMA SRM 1R and provided with a 100 kN load cell, the compression strength and the compression elastic modulus of the test pieces thus obtained were measured in an environment of 23° C. temperature and 50% relative humidity, under a condition of 1.27 mm/min crosshead speed; and the measured values were converted with Vf (volume fraction of fiber) 60%. The six test pieces were measured similarly and an average of values was obtained. It should be noted that the measurement was performed by attaching a tab, which had been cut from the same plate, to each of the test pieces.

[Evaluation of 0° Bending Property]

4 plies of the prepreg were layered and bagged. The inside of the bag was depressurized by a vacuum pump, and then the autoclave curing or the vacuum bag curing took place to obtain six pieces of the fiber-reinforced composite material (test pieces) of 12.7 mm in width, 120 mm in length, and 2 mm in thickness.

Using INSTRON 4465 as a measuring device, which is compliant with ASTM D790 and provided with a 5 kN load cell, the bending strength, the bending elastic modulus, and the bending breaking strain of the test pieces thus obtained were measured in an environment of 23° C. temperature and 50% relative humidity, under conditions of: R of indenter=5.0R; R of support=3.2R; and L/D=40. The measured values for the bending strength and the bending elastic modulus were converted with Vf 56%. The six test pieces were measured similarly and an average of values was obtained.

[Evaluation of 90° Bending Property]

4 plies of the prepreg were layered and bagged. The inside of the bag was depressurized by a vacuum pump, and then the autoclave curing or the vacuum bag curing took place to obtain six pieces of the fiber-reinforced composite material (test pieces) which are 25.4 mm in width, 60 mm in length, and 2 mm in thickness.

Using INSTRON 4465 as a measuring device, which is compliant with ASTM D790 and provided with 500 kN load cell, the bending strength, the bending elastic modulus, and the bending breaking strain of the test pieces thus obtained were measured in an environment of 23° C. temperature and 50% relative humidity, under conditions of: R of indenter=5.0R; R of support=3.2R; and L/D=16. The six test pieces were measured similarly and an average of values was obtained.

[Evaluation of ILSS Property]

4 plies of the prepreg were layered and bagged. The inside of the bag was depressurized by a vacuum pump, and then the autoclave curing or the vacuum bag curing took place to obtain six pieces of the fiber-reinforced composite material (test pieces) of 6.3 mm in width, 20 mm in length, and 2.6 mm in thickness.

Using INSTRON 4465 as a measuring device, which is compliant with ASTM D 2344 and provided with a 5 kN load cell, the ILSS (interlayer shearing strength) of the test pieces thus obtained was measured in an environment of 23°

C. temperature and 50% relative humidity, under conditions of: 1.27 mm/min in cross-head speed; R of indenter=3.2R; R of support=1.6R; and L/D=4.

[Evaluation of G'-Tg]

Four plies of the prepreg were layered and bagged. The inside of the bag was depressurized by a vacuum pump, and then the autoclave curing or the vacuum bag curing took place to obtain 1 piece of the fiber-reinforced composite material (test pieces) which is 12.7 mm in width, 55 mm in length, and 2 mm in thickness.

Using ARES-RDA (manufactured by TA instruments), which is compliant with ASTM D4065, G'-Tg of the test pieces thus obtained was measured under conditions of: heating rate of 5° C./min; frequency of 1 Hz; strain of 0.05%; and measuring temperature range of room temperature to 180° C.

[Preparation of Thermal Curing Agent Masterbatch]

The component (A), the component (C) and a curing aid were measured according to the composition shown in Table 1, agitated and blended in a container. The mixture thus obtained was further finely blended by a triple roll mill to obtain a thermal curing agent masterbatch.

TABLE 1

| Composition (Parts by mass) | | Thermal curing agent masterbatch |
|---|---|---|
| Component (A) | A-1 | 100 |
| Component (C) | C-1 | 50 |
| Curing aid | DCMU | 33 |

[Preparation of Polymerization Initiator Masterbatches 1 to 3]

The component (A) and the component (D) were measured according to the compositions shown in Table 2, agitated, and blended in containers. The mixtures thus obtained were further finely blended by a triple roll mill to obtain polymerization initiator masterbatches 1 to 3.

TABLE 2

| Composition (Parts by mass) | | Photopolymerization initiator masterbatch 1 | Photopolymerization initiator masterbatch 2 | Photopolymerization initiator masterbatch 3 |
|---|---|---|---|---|
| Component (A) | A-1 | 100 | 100 | 100 |
| Component (D) | D-1 | 100 | 0 | 0 |
| | D-2 | 0 | 100 | 0 |
| | D-3 | 0 | 0 | 100 |

[Preparation of Thermal Curing Agent-and-Polymerization Initiator-Blended Masterbatches 1 and 2]

The component (B), the component (C), the component (D) and a curing aid were measured according to the compositions shown in Table 3, agitated and blended in containers. The mixtures thus obtained were further finely blended by a triple roll mill to obtain thermal curing agent-and-photopolymerization initiator-blended masterbatches.

TABLE 3

| Composition (Parts by mass) | | Thermal-and-photo-reaction initiator-blended masterbatch 1 | Thermal-and-photo-reaction initiator-blended masterbatch 2 |
|---|---|---|---|
| Component (B) | B-1 | 100 | 0 |
| | B-2 | 0 | 100 |
| Component (C) | C-1 | 42 | 42 |
| Component (D) | D-4 | 28 | 28 |
| Curing aid | DCMU | 20 | 20 |

Example 1

Preparation of Matrix Resin Composition 57.7 parts by mass of A-1 and 18 parts by mass of A-2 were measured, as the component (A), in glass flask, heated to 130° C. in an oil bath, blended, and then cooled to approximately 60° C. To the mixture thus obtained, 10 parts by mass of B-1 as the component (B); 22.5 parts by mass of the thermal curing agent masterbatch prepared above (Table 1); and 4 parts by mass of the polymerization initiator masterbatch 1 prepared above (Table 2) were added, and agitated to blend by using a hybrid mixer (trade name: HM-500 manufactured by KEYENCE CORPORATION), thereby obtaining a matrix resin composition 1.

As a result of measuring a viscosity change by ultraviolet irradiation of the matrix resin composition 1 thus obtained, viscosity before the ultraviolet irradiation was $5.5 \times 10^1$ Pa·sec and viscosity after a single ultraviolet irradiation was $2.5 \times 10^3$ Pa·sec at 30° C.

[Production of Prepreg]

A sheet of mold release paper was wrapped around a drum winding machine in which a drum of 2 m in circumference was installed. Carbon fiber 1 was wound therearound with a setting of 200 g/m² FAW (fiber areal weight).

Meanwhile, the temperature of a resin in a resin bath was maintained at 40° C. to 50° C., and the matrix resin composition 1 was applied to a tow of the carbon fiber bundle 1 using a touch roller with a clearance of a doctor blade being set to 200 to 400 μm. And then, around the carbon fiber bundle 1 wound around the drum in advance, the tow onto which the matrix resin composition 1 had been applied was wound with the settings of 2 m/min drum circumferential speed and 200 g/m² FAW. Thereafter, the carbon fiber bundle 1 was wound therearound with the setting of 200 g/m² FAW, a sheet of mold release paper was attached thereonto, and all the above described matters were removed from the drum. These matters were processed, without heating, three times by a fusing press machine (trade name: JR-600S manufactured by Asahi Fiber Industry Corporation, processing length: 1340 mm, pressure: cylinder pressure) under conditions of 0.2 MPa pressure and 0.9 m/min feed speed, to thereby obtain a prepreg 1.

An attempt to disassemble the prepreg 1 by fingers failed and the prepreg 1 was not disassembled, since the matrix resin composition 1 fully functioned as a bond between the carbon fibers. In addition, a non-impregnated part of the matrix resin composition 1 was not visually observed, which means that a superior impregnation state was confirmed.

And then, the prepreg 1 thus obtained was irradiated with ultraviolet rays of 240 mW/cm² in illumination and 320 mJ/cm² in irradiance, using a metal halide lamp (manufactured by EYE GRAPHICS Co., Ltd.).

The tack property and flexibility of the prepreg 1 thus irradiated with the ultraviolet rays were evaluated. The results are shown in Table 4.

Examples 2

Preparation of Matrix Resin Composition

A matrix resin composition 2 was obtained in a similar way to Example 1, except for the composition being changed to that shown in Table 4.

As a result of measuring a viscosity change by ultraviolet irradiation of the matrix resin composition 2 thus obtained, viscosity before the ultraviolet irradiation was $8.7 \times 10^1$ Pa·sec and viscosity after a single ultraviolet irradiation was $1.2 \times 10^5$ Pa·sec at 30° C.

[Production of Prepreg]

A prepreg 2 was produced in a similar way to Example 1, except for the matrix resin composition 2 being used. The prepreg 2 thus obtained was irradiated with ultraviolet rays in a similar way to Example 1. The impregnation property of the matrix resin composition 2, as well as the tack property and flexibility of the prepreg 2 thus irradiated with the ultraviolet rays were evaluated. The results are shown in Table 4.

The weight of the prepreg thus obtained measured by a solvent method was 594 $g/m^2$ FAW, and 34% resin content.

In addition, the prepreg thus obtained was layered in a predetermined number of layers and then cured by the autoclave curing to produce a fiber-reinforced composite material, which was evaluated for various properties. The results are shown in Table 4.

Example 3

A matrix resin composition 3 was obtained in a similar way to Example 1, except for the composition being changed to that shown in Table 4.

A prepreg 3 was produced in a similar way to Example 1, except for the matrix resin composition 3 being used. The prepreg 3 thus obtained was irradiated with ultraviolet rays in a similar way to Example 1. The impregnation property of the matrix resin composition 3, as well as the tack property and flexibility of the prepreg 3 thus irradiated with the ultraviolet rays were evaluated. The results are shown in Table 4.

The weight of the prepreg thus obtained measured by a solvent method was 592 $g/m^2$ FAW, and 27% resin content.

In addition, the prepreg thus obtained was layered in a predetermined number of layers and then cured by the autoclave curing to produce a fiber-reinforced composite material, which was evaluated for various properties. The results are shown in Table 4.

Example 4

A matrix resin composition 4 was obtained in a similar way to Example 1, except for the composition being changed to that shown in Table 4.

A prepreg 4 was produced in a similar way to Example 1, except for the matrix resin composition 4 being used. The prepreg 4 thus obtained was irradiated with ultraviolet rays in a similar way to Example 1. The impregnation property of the matrix resin composition 4, as well as the tack property and flexibility of the prepreg 4 thus irradiated with the ultraviolet rays were evaluated. The results are shown in Table 4. The weight of the prepreg thus obtained measured by a solvent method was 539 $g/m^2$ FAW, and 36% resin content.

In addition, the prepreg thus obtained was layered in a predetermined number of layers and then cured by the autoclave curing to produce a fiber-reinforced composite material, which was evaluated for various properties. The results are shown in Table 4.

TABLE 4

| | | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|---|
| | | Matrix resin composition 1 | Matrix resin composition 2 | Matrix resin composition 3 | Matrix resin composition 4 | Matrix resin composition 5 | Matrix resin composition 5 | Matrix resin composition 6 | Matrix resin composition 7 | Matrix resin composition 8 | Matrix resin composition 9 | Matrix resin composition 10 |
| A | jER828 | 72 | 60 | 60 | 60 | 50 | 50 | 50 | 66.4 | 56 | 40 | 40 |
| | jER1001 | 18 | 15 | 15 | 15 | — | — | — | 20 | 14 | 10 | 60 |
| A | AER4152 3000A | 10 | 25 | 25 | 25 | 40 | 40 | 40 | — | — | — | — |
| B | UE-8740 | — | — | — | — | 10 | 10 | 10 | — | — | — | — |
| | Dicy | 6.1 | 5.1 | 5.1 | 5.1 | 4.2 | 4.2 | 4.2 | 6.8 | 4.8 | 3.4 | 5 |
| C | DCMU | 4.1 | 3.4 | 3.4 | 3.4 | 2.8 | 2.8 | 2.8 | 4.5 | 3.2 | 2.3 | 3.3 |
| — | irgacure379 | 2 | 2 | — | — | — | — | — | — | 2 | 2 | — |
| D | irgacure369 | — | — | 2 | 2 | — | — | — | — | — | — | — |
| | irgacure907 | — | — | — | — | 2 | 2 | 2 | — | — | — | — |
| | irgacure184 | — | — | — | — | — | — | — | — | — | — | — |
| Total amount of composition (A) (mass %) | | 90 | 75 | 75 | 75 | 90 | 90 | 90 | 100 | 70 | 50 | 100 |
| Total amount of composition (B) (mass %) | | 10 | 25 | 25 | 25 | 10 | 10 | 10 | 0 | 30 | 50 | 0 |
| Resin viscosity (30° C. (Pa · sec)) | Before UV irradiation | $5.5 \times 10^1$ | $8.7 \times 10^1$ | $9.0 \times 10^1$ | $9.2 \times 10^1$ | $5.8 \times 10^2$ | $5.8 \times 10^2$ | $4.2 \times 10^1$ | $6.0 \times 10^1$ | $1.5 \times 10^2$ | $8.0 \times 10^4$ | $7.3 \times 10^3$ |
| | After UV irradiation | $2.5 \times 10^3$ | $1.2 \times 10^5$ | $1.3 \times 10^5$ | $1.2 \times 10^5$ | $9.3 \times 10^3$ | $9.3 \times 10^3$ | $1.8 \times 10^4$ | $6.2 \times 10^1$ | $1.8 \times 10^5$ | $1.3 \times 10^6$ | $7.4 \times 10^3$ |
| Carbon fiber | | Carbon fiber 1 Prepreg 1 | Carbon fiber 1 Prepreg 2 | Carbon fiber 1 Prepreg 3 | Carbon fiber 1 Prepreg 4 | Carbon fiber 2 Prepreg 5 | Carbon fiber 3 Prepreg 6 | — | Carbon fiber 2 Prepreg 7 | Carbon fiber 1 Prepreg 8 | — | Carbon fiber 1 Prepreg 9 |

TABLE 4-continued

| | | Example 1 | Example 2 | Example 3 | Example 4 | Example 5 | Example 6 | Example 7 | Comparative Example 1 | Comparative Example 2 | Comparative Example 3 | Comparative Example 4 |
|---|---|---|---|---|---|---|---|---|---|---|---|---|
| Position correction property | After UV irradiation | ○ | ○ | ○ | ○ | ○ | ○ | — | X | ○ | — | ○ |
| | After UV irradiation | ○ | ○ | ○ | ○ | ○ | ○ | — | ○ | X | — | ○ |
| Bonding property Evaluation | Impregnation property*1 | ○ | ○ | ○ | ○ | ○ | ○ | — | ○ | ○ | — | ○ |
| | Tack property*2 | ○ | ○ | ○ | ○ | ○ | ○ | — | X (High) | X (Low) | — | ⊚ |
| | Flexibility | ○ | ○ | ○ | ○ | ○ | ○ | — | ○ | ○ | — | X |
| | 0° compression strength (MPa)*1 | — | 1310 | 1450 | 1500 | 1470 | 1560 | — | — | — | — | — |
| | 0° compression elastic modulus (GPa)*1 | — | 116 | 117 | 127 | 138 | 117 | — | — | — | — | — |
| | 0° bending strength (MPa)*1 | — | 1420 | 1460 | 1370 | 1500 | 1620 | — | — | — | — | — |
| | 0° bending elastic modulus (GPa)*1 | — | 118 | 108 | 115 | 120 | 123 | — | — | — | — | — |
| | 90° bending strength (MPa) | — | 67 | 63 | 72 | 123 | 120 | — | — | — | — | — |
| | 90° bending elastic modulus (GPa) | — | 7.6 | 7.6 | 8.4 | 7.4 | 7.9 | — | — | — | — | — |
| | Interlayer shearing strength | — | 84 | 82 | 83 | 90 | 91 | — | — | — | — | — |
| | G'-Tα(° C.) | — | 90 | 90 | 91 | 115 | 111 | — | — | — | — | — |

*1 All values converted with 56% vf
*1 Impregnation ○; tack property ○; and flexibility ○ easily estimable from data for resin component 6 (viscosity change by heating and UV irradiation)
*2 Impregnation ○; tack property X; and flexibility ○ easily estimable from data for resin component 9 (viscosity change by heating and UV irradiation)

It should be noted that, in Table 4, "Content of Component (B)" is a proportion of the component (B) to a total of the amount of the whole component (A) and the blending amount of the component (B) being 100% by mass.

Example 5

Preparation of Resin Composition 50 parts by mass of A-1 and 40 parts by mass of A-3 were measured, as the component (A), in glass flask, heated to 130° C. in an oil bath, blended, and then cooled to approximately 60° C. The mixture was put into a kneader, 19 parts by mass of the thermal curing agent-and-polymerization initiator-blended masterbatch 1 (Table 3) prepared in advance was added thereto, and agitated at 60° C. to obtain a matrix resin composition 5.

As a result of measuring a viscosity change by ultraviolet irradiation of the matrix resin composition 5 thus obtained, viscosity before the ultraviolet irradiation was $5.8 \times 10^2$ Pa·sec and viscosity after a single ultraviolet irradiation was $9.3 \times 10^3$ Pa·sec at 30° C.

[Production of Prepreg]

A prepreg was produced in the following manner, using the prepreg producing device illustrated in FIG. 1. The carbon fiber 3 was used as the reinforcing fiber.

First, a resin bath of the application unit 12 was charged with the matrix resin composition 5 and a resin temperature in the resin bath was maintained at 60° C. A rip clearance of the die 12a was set to 300 μm, a continuous first reinforcing fiber sheet A1 was formed by using carbon fiber; and the matrix resin composition 5 was applied to a first face thereof. A continuous second reinforcing fiber sheet A2 was formed by using carbon fiber, and laminated onto the face of the A1 to which the matrix resin composition 5 had been applied. And then, the A1 and the A2 were withdrawn under a condition of 5.0 m/min in withdrawal rate; a protection sheet was fed from the protection sheet supply roll 14; and these fiber base materials were further sandwiched between the protection sheets.

Thereafter, by using the pressurization unit 13, the A2 was impregnated with the matrix resin composition 5 which had been applied to the A1 under a condition of $9.8 \times 10^3$ N as a compression force of the pressurization rollers 13a, 13b, to thereby obtain a prepreg. And then, the prepreg thus obtained was irradiated with ultraviolet rays of 240 mW/cm$^2$ in illumination and 320 mJ/m in irradiance, using a metal halide lamp (manufactured by EYE GRAPHICS Co., Ltd.). The tack property and flexibility of the prepreg thus irradiated with ultraviolet rays were evaluated. The results are shown in Table 5.

The weight of the prepreg 5 thus obtained measured by a solvent method was 562 g/m$^2$ FAW, and 35% resin content.

In addition, the prepreg thus obtained was layered in a predetermined number of layers and then cured by the vacuum bag curing to produce a fiber-reinforced composite material, which was evaluated for various properties. The results are shown in Tables 4 and 5.

Example 6

Production of Prepreg

A prepreg 6 was obtained by the same method as Example 1, using the carbon fiber 3 and the matrix resin composition 5. The weight of the prepreg thus obtained measured by a solvent method was 313 g/m$^2$ FAW, and 31% resin content.

In addition, the prepreg thus obtained was layered in a predetermined number of layers and then cured by the vacuum bag curing to produce a fiber-reinforced composite material, which was evaluated for various properties. The results are shown in Tables 4 and 5.

Example 7

Preparation of Matrix Resin Composition 50 parts by mass of A-1 and 40 parts by mass of A-3 were measured, as the component (A), in glass flask, heated to 130° C. in an oil bath, blended, and then cooled to approximately 60° C. The mixture was put into a kneader, 19 parts by mass of the thermal curing agent-and-polymerization initiator-blended masterbatch 2 (Table 3) prepared in advance was added thereto, and agitated at 60° C. to obtain a matrix resin composition 6.

As a result of measuring a viscosity change by ultraviolet irradiation of the matrix resin composition 6 thus obtained, viscosity before the ultraviolet irradiation was $4.2 \times 10^2$ Pa·sec and viscosity after a single ultraviolet irradiation was $1.8 \times 10^4$ Pa·sec at 30° C. Supposing that a prepreg was produced using the matrix resin composition 6, the tack property and flexibility thereof could be estimated to be within an appropriate range (evaluation of the circle symbol to both properties), based on the viscosity of before and after the ultraviolet ray irradiation, compared to the matrix resin composition 5. Therefore the production of a prepreg was omitted.

Example 8

Production of Prepreg

A prepreg 10 was obtained by the same method as Example 1, using the carbon fiber 3 and the matrix resin composition 5. The weight of the prepreg thus obtained measured by a solvent method was 467 g/m$^2$ FAW, and 29% resin content.

In addition, the prepreg thus obtained was layered in a predetermined number of layers and then cured by the vacuum bag curing to produce a fiber-reinforced composite material, which was evaluated for various properties. The results are shown in Table 5.

Example 9

Production of Prepreg

A prepreg 11 was obtained by the same method as Example 5, using the carbon fiber 3 and the matrix resin composition 5. The weight of the prepreg thus obtained measured by a solvent method was 790 g/m$^2$ FAW, and 30% resin content.

In addition, the prepreg thus obtained was layered in a predetermined number of layers and then cured by the vacuum bag curing to produce a fiber-reinforced composite material, which was evaluated for various properties. The results are shown in Table 5.

Example 10

Production of Prepreg

Figure 2:
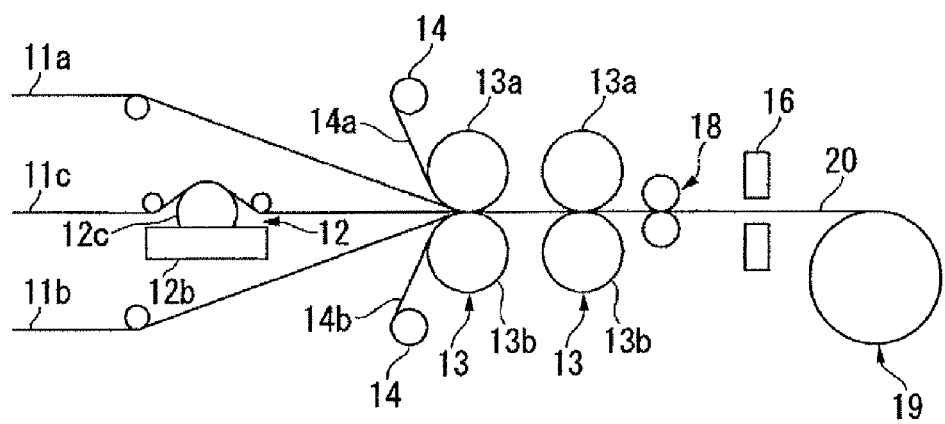
FIG. 2 is a schematic view illustrating a prepreg production machine of the present invention.

A prepreg was produced with the carbon fiber 3 and the matrix resin composition 5 in the following manner, using the prepreg producing device 10 illustrated in FIG. 2.

First, a resin bath 12b of the application means 12 was charged with the resin composition 3 and a resin temperature in the resin bath was maintained at 50° C. In addition, clearance of the doctor blade (not illustrated) was set to 530 μm. As reinforcing fiber sheets A1 to A3, sheet-like reinforcing fiber sheets, in which carbon fiber tows are aligned in one direction without interval, were used.

And then, the reinforcing fiber sheet A1, the reinforcing fiber sheet A2 and the reinforcing fiber sheet A3 were withdrawn by a driving roller 19 under a condition of 6.0 m/min in withdrawal rate; the resin composition 3 was applied to the reinforcing fiber sheet A3 by the application means 12; the reinforcing fiber sheet A3 was sandwiched between the reinforcing fiber sheet A1 and the reinforcing fiber sheet A2; protection sheets 14a, 14b were fed from a feeding means 14; and these reinforcing fiber sheets are further sandwiched between the protection sheets 14a, 14b.

Subsequently, the reinforcing fiber sheet A1 and the reinforcing fiber sheet A2 were impregnated with the resin composition 3 that had been attached to the reinforcing fiber sheet A3 by an impregnation means 13, under a condition of $130.7 \times 10^3$ N as a compression force of the pressurization rollers 13a and 13b (for a width of 1 m of a prepreg precursor); and a prepreg thus obtained was wound by a winding means. And then, the prepreg thus obtained was irradiated with ultraviolet rays of 240 mW/cm² in illumination and 320 mJ/cm² in irradiance, using a metal halide lamp (manufactured by EYE GRAPHICS Co., Ltd.). The tack property and flexibility of the prepreg thus irradiated with ultraviolet rays were evaluated. The results are shown in Table 5.

The weight of the prepreg 12 thus obtained measured by a solvent method was 911 g/m² FAW, and 34% resin content.

In addition, the prepreg thus obtained was layered in a predetermined number of layers and then cured by the vacuum bag curing to produce a fiber-reinforced composite material, which was evaluated for various properties. The results are shown in Table 5.

Example 11

Production of Prepreg

A prepreg 13 was obtained by the same method as Example 10, using the carbon fiber 3 and the matrix resin composition 5. The weight of the prepreg thus obtained measured by a solvent method was 1240 g/m² FAW, and 29% resin content. The tack property and flexibility of the prepreg were evaluated. The results are shown in Table 5. In addition, the prepreg thus obtained was layered in a predetermined number of layers and then cured by the vacuum bag curing to produce a fiber-reinforced composite material, which was evaluated for various properties. The results are shown in Table 5.

TABLE 5

| | | Example 5 | Example 6 | Example 8 | Example 9 | Example 10 | Example 11 |
|---|---|---|---|---|---|---|---|
| | Matrix resin composition | Matrix resin composition 5 | Matrix resin composition 5 | Matrix resin composition 5 | Matrix resin composition 5 | Matrix resin composition 5 | Matrix resin composition 5 |
| | Carbon fiber | Carbon fiber 2 | Carbon fiber 3 | Carbon fiber 3 | Carbon fiber 3 | Carbon fiber 3 | Carbon fiber 3 |
| Prepreg | | Prepreg 5 | Prepreg 6 | Prepreg 10 | Prepreg 11 | Prepreg 12 | Prepreg 13 |
| | Production method | Double layer | Single layer | Single layer | Double layer | Triple layer | Triple layer |
| | FAW (g/m²) | 600 | 300 | 450 | 750 | 900 | 1200 |
| | Actual measured FAW (g/m²) | 595 | 313 | 467 | 790 | 911 | 1240 |
| | Resin content (%) | 33 | 31 | 29 | 30 | 34 | 29 |
| Resin viscosity (30° C. (Pa·sec)) | Before UV irradiation | $5.8 \times 10^2$ | $5.8 \times 10^2$ | $5.8 \times 10^2$ | $5.8 \times 10^2$ | $5.8 \times 10^2$ | $5.8 \times 10^2$ |
| | After UV irradiation | $9.3 \times 10^3$ | $9.3 \times 10^3$ | $9.3 \times 10^3$ | $9.3 \times 10^3$ | $9.3 \times 10^3$ | $9.3 \times 10^3$ |
| Drape property (°) | Before UV irradiation | 43 | 63 | 53 | 40 | 43 | 33 |
| | After UV irradiation | 46 | 54 | 53 | 50 | 43 | 33 |
| Tack (load (g)) | Before UV irradiation | 5.3 | 13.5 | 8.3 | 13.3 | 5.0 | 9.0 |
| | After UV irradiation | 8.3 | 1200 | 1200 | 40.5 | 5.0 | 9.3 |
| Position correction property | Before UV irradiation | X | X | X | X | X | X |
| | After UV irradiation | ○ | ○ | ○ | ○ | ○ | ○ |
| Bonding property | Before UV irradiation | ○ | ○ | ○ | ○ | ○ | ○ |
| | After UV irradiation | ○ | ○ | ○ | ○ | ○ | ○ |
| Composite physical property | 90° bending strength (MPa) | 136 | 136 | 124 | 120 | 125 | 115 |
| | 90° bending elastic modulus (GPa) | 7.21 | 7.86 | 7.85 | 7.21 | 6.99 | 7.54 |
| | G'-Tg (° C.) | 115 | 116 | 111 | 116 | 116 | 111 |

Examples 12 to 14

Production of Prepreg

Ultraviolet rays were emitted by the same method as Example 5 using a metal halide lamp (manufactured by EYE GRAPHICS Co., Ltd.), with illumination of 240 mW/cm² and irradiance of 80, 160, and 480 mJ/cm², to thereby obtain prepregs 14 to 16. The tack property and flexibility of the prepregs thus obtained were evaluated. The results are shown in Table 6. In addition, the prepreg thus obtained was layered in a predetermined number of layers and then cured by the vacuum bag curing to produce a fiber-reinforced composite material, which was evaluated for various properties. The results are shown in Table 6.

TABLE 6

|  |  | Example 12 | Example 13 | Example 5 | Example 14 |
|---|---|---|---|---|---|
| Matrix resin composition | | Matrix resin composition 5 | Matrix resin composition 5 | Matrix resin composition 5 | Matrix resin composition 5 |
| Carbon fiber | | Carbon fiber 2 | Carbon fiber 2 | Carbon fiber 2 | Carbon fiber 2 |
| Prepreg | | Prepreg 14 | Prepreg 15 | Prepreg 5 | Prepreg 16 |
| | Production method | Double layer | Double layer | Double layer | Double layer |
| | FAW (g/m$^2$) | 600 | 600 | 600 | 600 |
| | Actual measured FAW (g/m$^2$) | 595 | 595 | 595 | 595 |
| | Resin content (%) | 33 | 33 | 33 | 33 |
| UV irradiation amount (mJ/cm$^2$) | | 80 | 160 | 320 | 480 |
| Resin viscosity (30° C. (Pa · sec)) | Before UV irradiation | $8.1 \times 10^2$ | $9.4 \times 10^2$ | $9.0 \times 10^2$ | $8.7 \times 10^2$ |
| | After UV irradiation | $1.2 \times 10^4$ | $1.2 \times 10^4$ | $1.3 \times 10^4$ | $1.3 \times 10^4$ |
| Drape property (°) | Before UV irradiation | 43 | 43 | 43 | 43 |
| | After UV irradiation | 45 | 44 | 46 | 40 |
| Tack (load (g)) | Before UV irradiation | 5 | 5 | 5 | 5 |
| | After UV irradiation | 5 | 6 | 19 | 375 |
| Position correction property | Before UV irradiation | X | X | X | X |
| | After UV irradiation | ○ | ○ | ○ | ○ |
| Bonding property | Before UV irradiation | ○ | ○ | ○ | ○ |
| | After UV irradiation | ○ | ○ | ○ | ○ |

Comparative Examples 5 to 7 and Example 15

Preparation of Matrix Resin Composition

Matrix resin compositions 11 to 14 were obtained by the same method as Example 5, except for changing the compositions to those shown in Table 7.

[Production of Prepreg]

Prepregs 17 to 20 were obtained by the same method as Example 5, using the matrix resin compositions 11 to 14. The tack property and flexibility of the prepregs thus obtained were evaluated. The results are shown in Table 7. In addition, the prepreg thus obtained was layered in a predetermined number of layers and then cured by the vacuum bag curing to produce a fiber-reinforced composite material, which was evaluated for various properties. The results are shown in Table 7.

TABLE 7

|  |  | Comparative Example 5 | Comparative Example 6 | Example 5 | Example 15 | Comparative Example 7 |
|---|---|---|---|---|---|---|
| Matrix resin composition | | Matrix resin composition 11 | Matrix resin composition 12 | Matrix resin composition 5 | Matrix resin composition 13 | Matrix resin composition 14 |
| Component(A) | jER828 | 60 | 55 | 50 | 35 | 30 |
| | jER1001 | 0 | 0 | 0 | 0 | 0 |
| | AER4152 | 40 | 40 | 40 | 40 | 40 |
| Component(B) | 3000A | 0 | 5 | 10 | 25 | 30 |
| | UE-8740 | 0 | 0 | 0 | 0 | 0 |
| Component(C) | Dicy | 4.2 | 4.2 | 4.2 | 4.2 | 4.2 |
| — | DCMU | 2.8 | 2.8 | 2.8 | 2.8 | 2.8 |
| Component(D) | irgacure379 | 0 | 0 | 0 | 0 | 0 |
| | irgacure369 | 0 | 0 | 0 | 0 | 0 |
| | irgacure907 | 0 | 0 | 0 | 0 | 0 |
| | irgacure184 | 2 | 2 | 2 | 2 | 2 |
| Total amount of composition (A) (mass %) | | 100 | 95 | 90 | 75 | 70 |
| Total amount of composition (B) (mass %) | | 0 | 5 | 10 | 25 | 30 |
| Resin physical property | Strength (Mpa) | 168 | 164 | 158 | 154 | 160 |
| | Elastic modulus (Gpa) | 3.40 | 3.32 | 3.32 | 3.32 | 3.41 |
| | Fracture elongation (%) | 8.15 | 9.03 | 9.54 | 7.68 | 8.94 |
| | Yield elongation (%) | 7.18 | 7.14 | 7.13 | 6.14 | 6.52 |
| | Density (g/cm$^3$) | 1.22 | 1.22 | 1.22 | 1.23 | 1.23 |
| | Tg (° C.) | 126 | 127 | 124 | 114 | 109 |
| Resin viscosity (30° C. (Pa · sec) | Before UV irradiation | $9.8 \times 10^2$ | $9.4 \times 10^2$ | $5.8 \times 10^2$ | $1.9 \times 10^3$ | $2.0 \times 10^3$ |
| | After UV irradiation | $8.2 \times 10^2$ | $2.4 \times 10^3$ | $9.3 \times 10^3$ | $8.0 \times 10^5$ | $1.7 \times 10^6$ |
| | Carbon fiber | Carbon fiber 2 | Carbon fiber 2 | Carbon fiber 2 | Carbon fiber 2 | Carbon fiber 2 |
| Prepreg | | Prepreg 17 | Prepreg 18 | Prepreg 5 | Prepreg 19 | Prepreg 20 |
| | Production method | Double layer | Double layer | Double layer | Double layer | Double layer |
| | FAW (g/m$^2$) | 600 | 600 | 600 | 600 | 600 |
| | Actual measured FAW (g/m$^2$) | 609 | 612 | 595 | 598 | 599 |
| | Resin content (%) | 30 | 31 | 33 | 32 | 31 |
| Drape property (°) | Before UV irradiation | 53 | 53 | 43 | 47 | 46 |
| | After UV irradiation | 51 | 54 | 46 | 45 | 47 |
| Tack (load (g)) | Before UV irradiation | 15.0 | 5.0 | 5.3 | 5.0 | 7.0 |
| | After UV irradiation | 25.0 | 54.5 | 82.5 | 1200 | |
| Position correction property | Before UV irradiation | X | X | X | X | X |
| | After UV irradiation | X | X | ○ | ○ | ○ |
| Bonding property | Before UV irradiation | ○ | ○ | ○ | ○ | ○ |
| | After UV irradiation | ○ | ○ | ○ | ○ | X |

TABLE 7-continued

| | | Comparative Example 5 | Comparative Example 6 | Example 5 | Example 15 | Comparative Example 7 |
|---|---|---|---|---|---|---|
| Composite physical property | 90° bending strength (MPa) | 131 | 132 | 136 | 136 | 143 |
| | 90° bending elastic modulus (GPa) | 8.47 | 8.34 | 7.21 | 8.29 | 8.38 |
| | G'-Tg (° C.) | 113 | 113 | 115 | 107 | 107 |

[Preparation of Matrix Resin Composition]

Matrix resin compositions 15 to 19 were obtained by the same method as Example 5, except for changing the compositions to those shown in Table 8.

[Production of Prepreg]

Prepregs 21 to 25 were obtained by the same method as Example 5, using the matrix resin compositions 15 to 19. In addition, the prepreg thus obtained was layered in a predetermined number of layers and then cured by the vacuum bag curing to produce a fiber-reinforced composite material, which was evaluated for various properties. The results are shown in Table 8.

Comparative Example 1

Preparation of Resin Composition 66.4 parts by mass of A-1 and 20 parts by mass of A-2 were measured, as the component (A), in glass flask, heated to 130° C. in an oil bath, blended, and then cooled to approximately 60° C. 25 parts by mass of the thermal curing agent masterbatch prepared above (Table 1) was added thereto, and agitated and blended in a water bath set to 60° C., to thereby obtain the matrix resin composition 7.

Viscosity measured by DSR-200 of the matrix resin composition 7 thus obtained was $6.0 \times 10^1$ Pa·sec at 30° C.

TABLE 8

| | | Example 16 | Example 17 | Example 18 | Example 19 | Example 20 |
|---|---|---|---|---|---|---|
| Matrix resin composition | | Matrix resin composition 15 | Matrix resin composition 16 | Matrix resin composition 17 | Matrix resin composition 18 | Matrix resin composition 19 |
| Component (A) | jER828 | 15 | 70 | 85 | 72 | 75 |
| | jER1001 | | | | 18 | |
| | AER4152 | 60 | 20 | 5 | | 0 |
| Component (B) | 3000A | 25 | 10 | 10 | 10 | 25 |
| | UE-8740 | | | | | |
| Component (C) | Dicy | 4.2 | 4.2 | 4.2 | 4.2 | 4.2 |
| — | DCMU | 2.8 | 2.8 | 2.8 | 2.8 | 2.8 |
| Component (D) | irgacure379 | 0 | 0 | 0 | 0 | 0 |
| | irgacure369 | 0 | 0 | 0 | 0 | 0 |
| | irgacure907 | 0 | 0 | 0 | 0 | 0 |
| | irgacure184 | 2 | 2 | 2 | 2 | 2 |
| Total amount of composition (A) (mass %) | | 75 | 90 | 90 | 90 | 75 |
| Total amount of composition (B) (mass %) | | 25 | 10 | 10 | 10 | 25 |
| Resin physical property | Strength (Mpa) | 169 | 158 | 153 | 150 | 152 |
| | Elastic modulus (Gpa) | 3.58 | 3.30 | 3.25 | 3.19 | 3.28 |
| | Fracture elongation (%) | 10.3 | 9.29 | 9.77 | 9.95 | 8.38 |
| | Yield elongation (%) | 6.78 | 7.11 | 7.14 | 7.03 | 6.90 |
| | Density (g/cm³) | 1.24 | 1.22 | 1.22 | 1.22 | 1.23 |
| | Tg (° C.) | 112 | 121 | 120 | 118 | 111 |
| Resin viscosity (30° C. (Pa · sec)) | Before UV irradiation | $3.9 \times 10^4$ | $6.1 \times 10^1$ | $1.3 \times 10^1$ | $4.6 \times 10^1$ | $1.2 \times 10^1$ |
| | After UV irradiation | $3.1 \times 10^6$ | $1.1 \times 10^4$ | $1.7 \times 10^4$ | $1.2 \times 10^4$ | $2.5 \times 10^5$ |
| | Carbon fiber | Carbon fiber 2 | Carbon fiber 2 | Carbon fiber 2 | Carbon fiber 2 | Carbon fiber 2 |
| Prepreg | | Prepreg 21 | Prepreg 22 | Prepreg 23 | Prepreg 24 | Prepreg 25 |
| | Production method | Double layer | Double layer | Double layer | Double layer | Double layer |
| | FAW (g/m²) | 600 | 600 | 600 | 600 | 600 |
| | Actual measured FAW (g/m²) | 611 | 610 | 620 | 612 | 616 |
| | Resin content (%) | 27 | 29 | 29 | 32 | 27 |
| Drape property | Before UV irradiation | 2 | 57 | 58 | 59 | 49 |
| | After UV irradiation | 2 | 59 | 58 | 56 | 53 |
| Tack (load (g)) | Before UV irradiation | 225.0 | 5.0 | 5.0 | 5.0 | 5.0 |
| | After UV irradiation | Joining not possible | 5.0 | 5.0 | 5.0 | 5.0 |
| Position correction property | Before UV irradiation | ○ | X | X | X | X |
| | After UV irradiation | ○ | ○ | ○ | ○ | ○ |
| Bonding property | Before UV irradiation | ○ | ○ | ○ | ○ | ○ |
| | After UV irradiation | X | ○ | ○ | ○ | ○ |
| Composite physical property | 90° bending strength (Mpa) | 113 | 135 | 127 | 121 | — |
| | 90° bending elastic modulus (Gpa) | 7.81 | 8.58 | 8.65 | 8.31 | — |
| | G'-Tg (° C.) | 108 | 114 | 107 | 109 | — |

[Production of Prepreg]

A sheet of mold release paper was wrapped around a drum winding machine in which a drum of 2 m in circumference was installed.

Meanwhile, the temperature of a resin in a resin bath was maintained at 40° C. to 50° C., and the matrix resin composition 7 was applied to a fiber bundle of the carbon fiber 2 using a touch roller with a clearance of a doctor blade being set to 500 to 600 μm. And then, around the mold release paper wrapped around the drum in advance, the tow onto which the matrix resin composition 7 had been applied was wound with the settings of 2 m/min drum circumferential speed and 600 g/m² FAW, and these are removed from the drum.

These matters were processed, without heating, three times by a fusing press machine (trade name: JR-600S manufactured by Asahi Fiber Industry Corporation, processing length: 1340 mm, pressure: cylinder pressure) under conditions of 0.2 MPa pressure and 0.9 m/min feed speed, to thereby obtain a prepreg 7.

As a result of visual observation of the prepreg 7 thus obtained, a non-impregnated part of the matrix resin composition 7 was not observed, which means that a superior impregnation state was confirmed.

In addition, the tack property and flexibility of the prepreg 7 were evaluated. The results are shown in Table 4.

Comparative Example 2

A matrix resin composition 8 was obtained in a similar way to Example 1, except for the composition being changed to that shown in Table 4.

A prepreg 8 was then produced in a similar way to Example 1, except for the matrix resin composition 8 being used. The prepreg 8 thus obtained was irradiated with ultraviolet rays in a similar way to Example 1. The impregnation property of the matrix resin composition 8, as well as the tack property and flexibility of the prepreg 8 thus irradiated with the ultraviolet rays were evaluated. The results are shown in Table 4.

Comparative Example 3

A resin composition 9 was obtained in a similar way to Example 1, except for the composition being changed to that shown in Table 4.

As a result of measuring a viscosity change by ultraviolet irradiation of the resin composition 9 thus obtained, viscosity before the ultraviolet irradiation was $8.0 \times 10^4$ Pa·sec and viscosity after single ultraviolet irradiation was $1.3 \times 10^6$ Pa·sec at 30° C.

From these results, it was confirmed that the viscosity of the resin composition 9 was sharply increased by the single ultraviolet irradiation. The tack property of the prepreg could thus be easily estimated to be weak (almost no tack). Therefore the production of a prepreg was omitted.

Comparative Example 4

Preparation of Matrix Resin Composition

A matrix resin composition 10 was obtained in a similar way to Example 1, except for the composition being changed to that shown in Table 4.

Viscosity measured by DSR-200 of the matrix resin composition 10 thus obtained was $7.2 \times 10^3$ Pa·sec at 30° C.

[Production of Prepreg]

The resin composition 10 thus obtained was applied to mold release paper by a comma coater (M-500 manufactured by HIRANO TECSEED Co., Ltd.) at 65° C., and a polyethylene film as the protection film was layered thereon, to thereby produce a hot melt film of 40.4 g/m² FAW.

The hot melt film was cut into 2 m and wrapped around a drum winding machine in which a drum of 2 m in circumference was installed. Carbon fiber 1 was wound therearound with a setting of 150 g/m² FAW. Another hot melt film cut into 2 m was attached thereto, to obtain a double film.

The double film was removed from the drum and processed three times by a fusing press machine heated to 100° C. (trade name: JR-600S manufactured by Asahi Fiber Industry Corporation, processing length: 1340 mm, pressure: cylinder pressure) under conditions of 0.2 MPa pressure and 0.9 m/min feed speed, to thereby obtain a prepreg. The prepreg thus obtained was stacked into four layers to obtain a prepreg 9 of 600 g/m² FAW.

The impregnation property of the resin composition 10, as well as the tack property and flexibility of the prepreg 9 were evaluated. The results are shown in Table 4.

As is obvious from Tables 4 and 5, the matrix resin compositions 1 to 5 of Examples 1 to 5 were superior in impregnation property with the reinforcing fiber. In addition, as a result of bending the prepregs 1 to 6 irradiated with ultraviolet rays that were obtained in Examples 1 to 6, superior flexibility was observed. As to tack, slight stickiness was observed and position correction was possible even after joining a prepreg with another prepreg.

On the other hand, the matrix resin composition 7 obtained in Comparative Example 1 was as superior as Examples in the impregnation property with the reinforcing fiber and the prepreg 7 showed superior flexibility upon being bent by finger; however, the matrix resin composition 7 was extremely high in tack property and the resin stuck to hand, and therefore position correction was difficult after joining a prepreg with another prepreg.

The matrix resin composition 8 obtained in Comparative Example 2 was as superior as Examples in the impregnation property with the reinforcing fiber and the prepreg 8 irradiated with ultraviolet rays showed superior flexibility upon being bent by finger; however, the matrix resin composition 8 was low in tack property and texture of the surface of the prepreg was almost dry.

The matrix resin composition 10 obtained in Comparative Example 4 was as superior as Examples in the impregnation property with the reinforcing fiber and the prepreg 9 had an appropriate tack property and superior position correction property; however, the prepreg 9 was rigid and inferior in flexibility upon being bent by finger.

INDUSTRIAL APPLICABILITY

According to the method for producing a prepreg of the present invention, even in the prepreg with the weight per square meter of the reinforcing fibers being 250-2,000 g/m², the reinforcing fiber assembly can be impregnated with the matrix resin composition without generating voids, and a prepreg having a superior flexibility and a tack property can be obtained. In addition, the prepreg obtained by the method for producing a prepreg of the present invention is free from springback.

According to the prepreg of the present invention, even a prepreg with the weight per square meter of the reinforcing fibers being 250-2,000 g/m² has a superior flexibility and a tack property. The prepreg is suitable for production of large sized structural materials for vehicles, windmills and the like.

According to the matrix resin composition of the present invention, in production of a prepreg with the weight per square meter of the reinforcing fibers being 250-2,000 g/m², a superior flexibility and a tack property can be obtained; and, in use as the fiber-reinforced composite material after curing, superior physical properties can be obtained.

According to the fiber-reinforced composite material of the present invention, even in a fiber-reinforced composite material with the weight per square meter of the reinforcing fibers being 250-2,000 g/m², a gap formed between a mold and a prepreg in production of a large sized molded product having a non-linear shape can be suppressed by superior followability to a mold due to superior flexibility and tack property; and generation of voids can be prevented by the appropriate tack property eliminating air pockets between the mold and the prepreg.

The invention claimed is:

1. A method for producing a prepreg which contains reinforcing fibers and a matrix resin composition with the weight per square meter of the reinforcing fibers being 250-2,000 g/m², the production method comprising the following steps (1)-(3):
   (1) a matrix resin composition blending step for obtaining a matrix resin composition having a viscosity of 12 Pa·s to 3,000 Pa·s at 30° C. by mixing an epoxy resin, a radically polymerizable unsaturated compound, an epoxy resin curing agent and a polymerization initiator that generates radicals, in said step the content of the radically polymerizable unsaturated compound relative to 100% by mass of the total of the epoxy resin and the radically polymerizable unsaturated compound being 10-25% by mass;
   (2) a matrix resin composition impregnating step for obtaining a prepreg precursor by impregnating a reinforcing fiber assembly being 250-2,000 g/m² in weight with the matrix resin composition; and
   (3) a surface viscosity increasing step of obtaining a prepreg in which viscosity of the matrix resin composition is increased more in a superficial part than in a central part, by letting the polymerization initiator present in the superficial part of the prepreg precursor generate a radical, while not letting the polymerization initiator present in the central part generate a radical, wherein
   the step (2) includes the following steps (2-i) to (2-iii):
   (2-i) a matrix resin composition applying step comprising applying the matrix resin composition only to one face of a first reinforcing fiber sheet A1 composed of consecutive reinforcing fiber bundles;
   (2-ii) a reinforcing fiber matrix laminating step comprising laminating a second reinforcing fiber sheet A2 composed of consecutive reinforcing fiber bundles onto the face of the fiber sheet A1 to which the matrix resin composition has been applied, wherein the matrix resin composition is only present on the A1 fiber sheet; and
   (2-iii) a pressurizing step comprising impregnating the A1 and the A2 fiber sheets with the matrix resin composition by pressurizing the A1 and A2 fiber sheets so that the matrix resin composition migrates outward from inside the A1 and the A2 fiber sheets to form the prepreg precursor.

2. The method for producing a prepreg according to claim 1, wherein a means for letting the polymerization initiator generate a radical in the above described step (3) is the following method (3-i):
   (3-i) a method of irradiating the prepreg precursor with an energy wave selected from a group consisting of: ultraviolet; infrared; visible light; and electron beam, with an incident intensity no greater than such an incident intensity that transmittance becomes 0% at a depth of 40% from a surface of the prepreg precursor with respect to a thickness of the prepreg precursor being 100%.

3. The method for producing a prepreg according to claim 2, wherein the polymerization initiator is α-aminoalkyl phenone or α-hydroxyalkyl phenone.

4. The method for producing a prepreg according to claim 1, wherein a means for letting the polymerization initiator generate a radical in the above described step (3) is the following method (3-ii):
   (3-ii) a method of heating the prepreg precursor from the outside in a non-contact state, for such a time period that a rate of temperature change becomes 0% at a depth of 40% from a surface of the prepreg precursor with respect to a thickness of the prepreg precursor being 100%.

5. The method for producing a prepreg according to claim 4, wherein the method (3-ii) is realized by high frequency heating.

6. The method for producing a prepreg according to claim 1, wherein the weight per square meter of the reinforcing fibers is 400-2,000 g/m².

7. The method for producing a prepreg according to claim 1, wherein the weight per square meter of the reinforcing fibers is 500-2,000 g/m².

8. The method for producing a prepreg according to claim 1, wherein in step (2-i), the matrix resin composition is applied only to one face of the first reinforcing fiber sheet A1 by: (i) a touch roller method in which the one face of the first reinforcing fiber sheet A1 contacts with the touch roller so that the matrix resin composition is applied only to the one face of the first reinforcing fiber sheet A1; or (ii) a die coating method in which the matrix resin composition is extruded from a resin bath and applied to the one face of the first reinforcing fiber sheet A1.

9. A method for producing a prepreg which contains reinforcing fibers and a matrix resin composition with the weight per square meter of the reinforcing fibers being 250-2,000 g/m², the production method comprising the following steps (1)-(3):
   (1) a matrix resin composition blending step for obtaining a matrix resin composition having a viscosity of 12 Pa·s to 3,000 Pa·s at 30° C. by mixing an epoxy resin, a radically polymerizable unsaturated compound, an epoxy resin curing agent and a polymerization initiator that generates radicals, in said step the content of the radically polymerizable unsaturated compound relative to 100% by mass of the total of the epoxy resin and the radically polymerizable unsaturated compound being 10-25% by mass;
   (2) a matrix resin composition impregnating step for obtaining a prepreg precursor by impregnating a reinforcing fiber assembly being 250-2,000 g/m² in weight with the matrix resin composition; and
   (3) a surface viscosity increasing step of obtaining a prepreg in which viscosity of the matrix resin composition is increased more in a superficial part than in a central part, by letting the polymerization initiator present in the superficial part of the prepreg precursor generate a radical, while not letting the polymerization initiator present in the central part generate a radical, wherein the step (2) includes the following steps (2-iv) to (2-vi):

(2-iv) a matrix resin composition applying step comprising applying the matrix resin composition only to one face of a first reinforcing fiber sheet A1 composed of consecutive reinforcing fiber bundles or applying the matrix resin composition only to both a first face and a second face of the first reinforcing fiber sheet A1;

(2-v) a reinforcing fiber matrix laminating step comprising laminating a second reinforcing fiber sheet A2 composed of consecutive reinforcing fiber bundles, and a third reinforcing fiber sheet A3 composed of consecutive reinforcing fiber bundles, onto the first face of the A1 fiber sheet and the second face of the A1 fiber sheet respectively, wherein the matrix resin composition is only present on the A1 fiber sheet; and (2-vi) a pressurizing step comprising impregnating the A1 fiber sheet, the A2 fiber sheet, and the A3 fiber sheet with the matrix resin composition by pressurizing the A1, the A2, and the A3 fiber sheets so that the matrix resin composition migrates outward from inside of the A1, the A2 and the A3 fiber sheets to obtain the prepreg precursor.

10. The method for producing a prepreg according to claim 9, wherein a means for letting the polymerization initiator generate a radical in the above described step (3) is the following method (3-i):

(3-i) a method of irradiating the prepreg precursor with an energy wave selected from a group consisting of: ultraviolet; infrared; visible light; and electron beam, with an incident intensity no greater than such an incident intensity that transmittance becomes 0% at a depth of 40% from a surface of the prepreg precursor with respect to a thickness of the prepreg precursor being 100%.

11. The method for producing a prepreg according to claim 9, wherein the weight per square meter of the reinforcing fibers is 400-2,000 g/m$^2$.

12. The method for producing a prepreg according to claim 9, wherein the weight per square meter of the reinforcing fibers is 500-2,000 g/m$^2$.

13. The method for producing a prepreg according to claim 9, wherein in step (2-iv), the matrix resin composition is applied to only one face of the first reinforcing fiber sheet A1.

14. The method for producing a prepreg according to claim 9, wherein in step (2-iv), the matrix resin composition is applied only to the first reinforcing fiber sheet A1 by: (i) a touch roller method in which the one face or the both first and second faces of the first reinforcing fiber sheet A1 contacts the touch roller so that the matrix resin composition is applied to the one face or the both first and second faces of the first reinforcing fiber sheet A1; or (ii) a die coating method in which the matrix resin composition is extruded from a resin bath and applied to the one face or the both first and second faces of the first reinforcing fiber sheet A1.

* * * * *